(12) United States Patent
Shabtay et al.

(10) Patent No.: US 12,216,246 B2
(45) Date of Patent: *Feb. 4, 2025

(54) MINIATURE TELEPHOTO LENS MODULE AND A CAMERA UTILIZING SUCH A LENS MODULE

(71) Applicant: Corephotonics Ltd., Tel Aviv (IL)

(72) Inventors: Gal Shabtay, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,478

(22) Filed: Apr. 22, 2024

(65) Prior Publication Data
US 2024/0288664 A1    Aug. 29, 2024

Related U.S. Application Data

(63) Continuation of application No. 17/389,510, filed on Jul. 30, 2021, now Pat. No. 11,994,654, which is a
(Continued)

(51) Int. Cl.
G02B 13/00        (2006.01)
G02B 7/02         (2021.01)
(Continued)

(52) U.S. Cl.
CPC ........... *G02B 13/001* (2013.01); *G02B 7/021* (2013.01); *G02B 9/60* (2013.01); *G02B 13/0045* (2013.01);
(Continued)

(58) Field of Classification Search
CPC ........ G02B 13/001; G02B 7/021; G02B 9/60; G02B 13/0045; G02B 13/02; G02B 13/06;
(Continued)

(56) References Cited

U.S. PATENT DOCUMENTS 2,106,752 A    2/1938 Land
2,354,503 A    7/1944 Arthur
(Continued)

FOREIGN PATENT DOCUMENTS

CN    101276415 A    10/2008
CN    101634738 A    1/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Shahbaz Nazrul
(74) *Attorney, Agent, or Firm* — Nathan & Associates; Menachem Nathan

(57) ABSTRACT

The presently disclosed subject matter includes a mobile electronic comprising an integrated camera, comprising a Wide camera unit comprising a Wide lens unit, and a Telephoto camera unit comprising a telephoto lens unit, the telephoto lens unit and the wide lens unit having respectively TTL/EFL ratios smaller and larger than 1 and defining separate telephoto and wide optical paths.

19 Claims, 15 Drawing Sheets

Related U.S. Application Data continuation of application No. 16/276,034, filed on Feb. 14, 2019, now Pat. No. 11,125,975, which is a continuation of application No. 15/540,676, filed as application No. PCT/IB2015/050044 on Jan. 3, 2015, now Pat. No. 10,288,840.

(51) Int. Cl.

| | | |
|---|---|---|
| *G02B 9/60* | (2006.01) | |
| *G02B 13/02* | (2006.01) | |
| *G02B 13/06* | (2006.01) | |
| *G03B 17/00* | (2021.01) | |
| *H04N 23/45* | (2023.01) | |
| *H04N 23/50* | (2023.01) | |
| *H04N 23/54* | (2023.01) | |
| *G02B 1/04* | (2006.01) | |

(52) U.S. Cl.
CPC .............. *G02B 13/02* (2013.01); *G02B 13/06* (2013.01); *G03B 17/00* (2013.01); *H04N 23/45* (2023.01); *H04N 23/50* (2023.01); *H04N 23/54* (2023.01); *G02B 1/041* (2013.01)

(58) Field of Classification Search
CPC ........ G02B 1/041; G03B 17/00; H04N 23/45; H04N 23/50; H04N 23/54
See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,085,354 A | 4/1963 | Rasmussen et al. |
| 3,388,956 A | 6/1968 | Eggert et al. |
| 3,524,700 A | 8/1970 | Eggert et al. |
| 3,558,218 A | 1/1971 | Grey |
| 3,584,513 A | 6/1971 | Gates |
| 3,864,027 A | 2/1975 | Harada |
| 3,941,001 A | 3/1976 | LaSarge |
| 3,942,876 A | 3/1976 | Betensky |
| 4,134,645 A | 1/1979 | Sugiyama et al. |
| 4,199,785 A | 4/1980 | McCullough et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,327,291 A | 7/1994 | Baker et al. |
| 5,331,465 A | 7/1994 | Miyano |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,502,537 A | 3/1996 | Utagawa |
| 5,657,402 A | 8/1997 | Bender et al. |
| 5,682,198 A | 10/1997 | Katayama et al. |
| 5,768,443 A | 6/1998 | Michael et al. |
| 5,892,855 A | 4/1999 | Kakinami et al. |
| 5,926,190 A | 7/1999 | Turkowski et al. |
| 5,940,641 A | 8/1999 | McIntyre et al. |
| 5,969,869 A | 10/1999 | Hirai et al. |
| 5,982,951 A | 11/1999 | Katayama et al. |
| 6,014,266 A | 1/2000 | Obama et al. |
| 6,035,136 A | 3/2000 | Hayashi et al. |
| 6,101,334 A | 8/2000 | Fantone |
| 6,128,416 A | 10/2000 | Oura |
| 6,147,702 A | 11/2000 | Smith |
| 6,148,120 A | 11/2000 | Sussman |
| 6,169,636 B1 | 1/2001 | Kreitzer |
| 6,201,533 B1 | 3/2001 | Rosenberg et al. |
| 6,208,765 B1 | 3/2001 | Bergen |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,268,611 B1 | 7/2001 | Pettersson et al. |
| 6,341,901 B1 | 1/2002 | Iwasa et al. |
| 6,520,643 B1 | 2/2003 | Holman et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,654,180 B2 | 11/2003 | Ori |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,187,504 B2 | 3/2007 | Horiuchi |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,515,351 B2 | 4/2009 | Chen et al. |
| 7,533,819 B2 | 5/2009 | Barkan et al. |
| 7,564,635 B1 | 7/2009 | Tang |
| 7,619,683 B2 | 11/2009 | Davis |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,016 B2 | 6/2010 | Toyofuku |
| 7,738,186 B2 | 6/2010 | Chen et al. |
| 7,773,121 B1 | 8/2010 | Huntsberger et al. |
| 7,777,972 B1 | 8/2010 | Chen et al. |
| 7,809,256 B2 | 10/2010 | Kuroda et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,880,776 B2 | 2/2011 | LeGall et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 7,964,835 B2 | 6/2011 | Olsen et al. |
| 7,978,239 B2 | 7/2011 | Deever et al. |
| 8,000,031 B1 | 8/2011 | Tsai |
| 8,004,777 B2 | 8/2011 | Sano et al. |
| 8,077,400 B2 | 12/2011 | Tang |
| 8,115,825 B2 | 2/2012 | Culbert et al. |
| 8,149,327 B2 | 4/2012 | Lin et al. |
| 8,149,523 B2 | 4/2012 | Ozaki |
| 8,154,610 B2 | 4/2012 | Jo et al. |
| 8,218,253 B2 | 7/2012 | Tang |
| 8,228,622 B2 | 7/2012 | Tang |
| 8,233,224 B2 | 7/2012 | Chen |
| 8,238,695 B1 | 8/2012 | Davey et al. |
| 8,253,843 B2 | 8/2012 | Lin |

(56) References Cited

U.S. PATENT DOCUMENTS

| | | |
|---|---|---|
| 8,274,552 B2 | 9/2012 | Dahi et al. |
| 8,279,537 B2 | 10/2012 | Sato |
| 8,363,337 B2 | 1/2013 | Tang et al. |
| 8,390,729 B2 | 3/2013 | Long et al. |
| 8,391,697 B2 | 3/2013 | Cho et al. |
| 8,395,851 B2 | 3/2013 | Tang et al. |
| 8,400,555 B1 | 3/2013 | Georgiev et al. |
| 8,400,717 B2 | 3/2013 | Chen et al. |
| 8,439,265 B2 | 5/2013 | Ferren et al. |
| 8,446,484 B2 | 5/2013 | Muukki et al. |
| 8,451,549 B2 | 5/2013 | Yamanaka et al. |
| 8,483,452 B2 | 7/2013 | Ueda et al. |
| 8,503,107 B2 | 8/2013 | Chen et al. |
| 8,514,491 B2 | 8/2013 | Duparre |
| 8,514,502 B2 | 8/2013 | Chen |
| 8,547,389 B2 | 10/2013 | Hoppe et al. |
| 8,553,106 B2 | 10/2013 | Scarff |
| 8,570,668 B2 | 10/2013 | Takakubo et al. |
| 8,587,691 B2 | 11/2013 | Takane |
| 8,619,148 B1 | 12/2013 | Watts et al. |
| 8,718,458 B2 | 5/2014 | Okuda |
| 8,752,969 B1 | 6/2014 | Kane et al. |
| 8,780,465 B2 | 7/2014 | Chae |
| 8,803,990 B2 | 8/2014 | Smith |
| 8,810,923 B2 | 8/2014 | Shinohara |
| 8,854,745 B1 | 10/2014 | Chen |
| 8,896,655 B2 | 11/2014 | Mauchly et al. |
| 8,958,164 B2 | 2/2015 | Kwon et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,229,194 B2 | 1/2016 | Yoneyama et al. |
| 9,235,036 B2 | 1/2016 | Kato et al. |
| 9,270,875 B2 | 2/2016 | Brisedoux et al. |
| 9,279,957 B2 | 3/2016 | Kanda et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,488,802 B2 | 11/2016 | Chen et al. |
| 9,568,712 B2 | 2/2017 | Dror et al. |
| 9,578,257 B2 | 2/2017 | Attar et al. |
| 9,618,748 B2 | 4/2017 | Munger et al. |
| 9,678,310 B2 | 6/2017 | Iwasaki et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,817,213 B2 | 11/2017 | Mercado |
| 9,851,803 B2 | 12/2017 | Fisher et al. |
| 9,869,846 B1 | 1/2018 | Bone et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0118471 A1 | 8/2002 | Imoto |
| 2002/0122113 A1 | 9/2002 | Foote |
| 2002/0136554 A1 | 9/2002 | Nomura et al. |
| 2002/0167741 A1 | 11/2002 | Koiwai et al. |
| 2003/0030729 A1 | 2/2003 | Prentice et al. |
| 2003/0048542 A1 | 3/2003 | Enomoto |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0162564 A1 | 8/2003 | Kimura et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0227838 A1 | 11/2004 | Atarashi et al. |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0041300 A1 | 2/2005 | Oshima et al. |
| 2005/0046740 A1 | 3/2005 | Davis |
| 2005/0062346 A1 | 3/2005 | Sasaki |
| 2005/0128604 A1 | 6/2005 | Kuba |
| 2005/0134697 A1 | 6/2005 | Mikkonen et al. |
| 2005/0141103 A1 | 6/2005 | Nishina |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0168840 A1 | 8/2005 | Kobayashi et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2005/0270667 A1 | 12/2005 | Gurevich et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0092524 A1 | 5/2006 | Konno |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2006/0238902 A1 | 10/2006 | Nakashima et al. |
| 2006/0275025 A1 | 12/2006 | Labaziewicz et al. |
| 2007/0024737 A1 | 2/2007 | Nakamura et al. |
| 2007/0035631 A1 | 2/2007 | Ueda |
| 2007/0114990 A1 | 5/2007 | Godkin |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0229983 A1 | 10/2007 | Saori |
| 2007/0247726 A1 | 10/2007 | Sudoh |
| 2007/0253689 A1 | 11/2007 | Nagai et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0056698 A1 | 3/2008 | Lee et al. |
| 2008/0084484 A1 | 4/2008 | Ochi et al. |
| 2008/0088942 A1 | 4/2008 | Seo |
| 2008/0094730 A1 | 4/2008 | Toma et al. |
| 2008/0094738 A1 | 4/2008 | Lee |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |

(56) References Cited

U.S. PATENT DOCUMENTS

| | | |
|---|---|---|
| 2008/0219654 A1 | 9/2008 | Border et al. |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0122423 A1 | 5/2009 | Park et al. |
| 2009/0128644 A1 | 5/2009 | Camp et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0168135 A1 | 7/2009 | Yu et al. |
| 2009/0190909 A1 | 7/2009 | Mise et al. |
| 2009/0200451 A1 | 8/2009 | Conners |
| 2009/0219547 A1 | 9/2009 | Kauhanen et al. |
| 2009/0225438 A1 | 9/2009 | Kubota |
| 2009/0234542 A1 | 9/2009 | Orlewski |
| 2009/0252484 A1 | 10/2009 | Hasuda et al. |
| 2009/0279191 A1 | 11/2009 | Yu |
| 2009/0295949 A1 | 12/2009 | Ojala |
| 2009/0295986 A1 | 12/2009 | Topliss et al. |
| 2009/0303620 A1 | 12/2009 | Abe et al. |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0026878 A1 | 2/2010 | Seo |
| 2010/0033844 A1 | 2/2010 | Katano |
| 2010/0060746 A9 | 3/2010 | Olsen et al. |
| 2010/0060995 A1 | 3/2010 | Yumiki et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0165476 A1 | 7/2010 | Eguchi |
| 2010/0196001 A1 | 8/2010 | Ryynänen et al. |
| 2010/0202068 A1 | 8/2010 | Ito |
| 2010/0214664 A1 | 8/2010 | Chia |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0277813 A1 | 11/2010 | Ito |
| 2010/0283842 A1 | 11/2010 | Guissin et al. |
| 2010/0321494 A1 | 12/2010 | Peterson et al. |
| 2011/0001838 A1 | 1/2011 | Lee |
| 2011/0032409 A1 | 2/2011 | Rossi et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0121666 A1 | 5/2011 | Park et al. |
| 2011/0128288 A1 | 6/2011 | Petrou et al. |
| 2011/0149119 A1 | 6/2011 | Matsui |
| 2011/0157430 A1 | 6/2011 | Hosoya et al. |
| 2011/0164172 A1 | 7/2011 | Shintani et al. |
| 2011/0188121 A1 | 8/2011 | Goring et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0249347 A1 | 10/2011 | Kubota |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0062783 A1 | 3/2012 | Tang et al. |
| 2012/0069235 A1 | 3/2012 | Imai |
| 2012/0069455 A1 | 3/2012 | Lin et al. |
| 2012/0075489 A1 | 3/2012 | Nishihara |
| 2012/0092777 A1 | 4/2012 | Tochigi et al. |
| 2012/0105579 A1 | 5/2012 | Jeon et al. |
| 2012/0105708 A1 | 5/2012 | Hagiwara |
| 2012/0124525 A1 | 5/2012 | Kang |
| 2012/0147489 A1 | 6/2012 | Matsuoka |
| 2012/0154547 A1 | 6/2012 | Aizawa |
| 2012/0154614 A1 | 6/2012 | Moriya et al. |
| 2012/0154929 A1 | 6/2012 | Tsai et al. |
| 2012/0194923 A1 | 8/2012 | Um |
| 2012/0196648 A1 | 8/2012 | Havens et al. |
| 2012/0229663 A1 | 9/2012 | Nelson et al. |
| 2012/0229920 A1 | 9/2012 | Otsu et al. |
| 2012/0249815 A1 | 10/2012 | Bohn et al. |
| 2012/0262806 A1 | 10/2012 | Lin et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0002933 A1 | 1/2013 | Topliss et al. |
| 2013/0016427 A1 | 1/2013 | Sugawara |
| 2013/0057971 A1 | 3/2013 | Zhao et al. |
| 2013/0063629 A1 | 3/2013 | Webster et al. |
| 2013/0076922 A1 | 3/2013 | Shihoh et al. |
| 2013/0088788 A1 | 4/2013 | You |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0176479 A1 | 7/2013 | Wada |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0208178 A1 | 8/2013 | Park |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0271852 A1 | 10/2013 | Schuster |
| 2013/0278785 A1 | 10/2013 | Nomura et al. |
| 2013/0279032 A1 | 10/2013 | Suigetsu et al. |
| 2013/0286221 A1 | 10/2013 | Shechtman et al. |
| 2013/0286488 A1 | 10/2013 | Chae |
| 2013/0321668 A1 | 12/2013 | Kamath |
| 2014/0009631 A1 | 1/2014 | Topliss |
| 2014/0022436 A1 | 1/2014 | Kim et al. |
| 2014/0049615 A1 | 2/2014 | Uwagawa |
| 2014/0063616 A1 | 3/2014 | Okano et al. |
| 2014/0092487 A1 | 4/2014 | Chen et al. |
| 2014/0118584 A1 | 5/2014 | Lee et al. |
| 2014/0139719 A1 | 5/2014 | Fukaya et al. |
| 2014/0146216 A1 | 5/2014 | Okumura |
| 2014/0160311 A1 | 6/2014 | Hwang et al. |
| 2014/0160581 A1 | 6/2014 | Cho et al. |
| 2014/0192224 A1 | 7/2014 | Laroia |
| 2014/0192238 A1 | 7/2014 | Attar et al. |
| 2014/0192253 A1 | 7/2014 | Laroia |
| 2014/0204480 A1 | 7/2014 | Jo et al. |
| 2014/0218587 A1 | 8/2014 | Shah |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0313316 A1 | 10/2014 | Olsson et al. |
| 2014/0362242 A1 | 12/2014 | Takizawa |
| 2014/0362274 A1 | 12/2014 | Christie et al. |
| 2014/0376090 A1 | 12/2014 | Terajima |

(56) References Cited

U.S. PATENT DOCUMENTS

| | | |
|---|---|---|
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0022896 A1 | 1/2015 | Cho et al. |
| 2015/0029601 A1 | 1/2015 | Dror et al. |
| 2015/0042870 A1 | 2/2015 | Chan et al. |
| 2015/0070781 A1 | 3/2015 | Cheng et al. |
| 2015/0086127 A1 | 3/2015 | Camilus et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0116569 A1 | 4/2015 | Mercado |
| 2015/0124059 A1 | 5/2015 | Georgiev et al. |
| 2015/0138381 A1 | 5/2015 | Ahn |
| 2015/0138431 A1 | 5/2015 | Shin et al. |
| 2015/0145965 A1 | 5/2015 | Livyatan et al. |
| 2015/0153548 A1 | 6/2015 | Kim et al. |
| 2015/0154776 A1 | 6/2015 | Zhang et al. |
| 2015/0160438 A1 | 6/2015 | Okuda |
| 2015/0162048 A1 | 6/2015 | Hirata et al. |
| 2015/0168667 A1 | 6/2015 | Kudoh |
| 2015/0177496 A1 | 6/2015 | Marks et al. |
| 2015/0181115 A1 | 6/2015 | Mashiah |
| 2015/0195458 A1 | 7/2015 | Nakayama et al. |
| 2015/0198464 A1 | 7/2015 | El Alami |
| 2015/0205068 A1 | 7/2015 | Sasaki |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0288865 A1 | 10/2015 | Osborne |
| 2015/0296112 A1 | 10/2015 | Park et al. |
| 2015/0316744 A1 | 11/2015 | Chen |
| 2015/0323757 A1 | 11/2015 | Bone |
| 2015/0334309 A1 | 11/2015 | Peng et al. |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0028949 A1 | 1/2016 | Lee et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0241756 A1 | 8/2016 | Chen |
| 2016/0245669 A1 | 8/2016 | Nomura |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0342095 A1 | 11/2016 | Bieling et al. |
| 2016/0349504 A1 | 12/2016 | Kim et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0023778 A1 | 1/2017 | Inoue |
| 2017/0070731 A1 | 3/2017 | Darling et al. |
| 2017/0094187 A1 | 3/2017 | Sharma et al. |
| 2017/0102522 A1 | 4/2017 | Jo |
| 2017/0115466 A1 | 4/2017 | Murakami et al. |
| 2017/0115471 A1 | 4/2017 | Shinohara |
| 2017/0124987 A1 | 5/2017 | Kim et al. |
| 2017/0150061 A1 | 5/2017 | Shabtay et al. |
| 2017/0153422 A1 | 6/2017 | Tang et al. |
| 2017/0160511 A1 | 6/2017 | Kim et al. |
| 2017/0187962 A1 | 6/2017 | Lee et al. |
| 2017/0199360 A1 | 7/2017 | Chang |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276911 A1 | 9/2017 | Huang |
| 2017/0276913 A1* | 9/2017 | Yao .............. G02B 27/0025 |
| 2017/0276954 A1 | 9/2017 | Bajorins et al. |
| 2017/0289458 A1 | 10/2017 | Song et al. |
| 2017/0294002 A1 | 10/2017 | Jia et al. |
| 2017/0310952 A1 | 10/2017 | Adomat et al. |
| 2017/0329108 A1 | 11/2017 | Hashimoto |
| 2017/0329111 A1 | 11/2017 | Hu et al. |
| 2017/0337703 A1 | 11/2017 | Wu et al. |
| 2018/0003925 A1 | 1/2018 | Shmunk |
| 2018/0013944 A1 | 1/2018 | Evans, V et al. |
| 2018/0017844 A1 | 1/2018 | Yu et al. |
| 2018/0024319 A1 | 1/2018 | Lai et al. |
| 2018/0024329 A1 | 1/2018 | Goldenberg et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0059379 A1 | 3/2018 | Chou |
| 2018/0081149 A1 | 3/2018 | Bae et al. |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0149835 A1 | 5/2018 | Park |
| 2018/0150973 A1 | 5/2018 | Tang et al. |
| 2018/0176426 A1 | 6/2018 | Wei et al. |
| 2018/0183982 A1 | 6/2018 | Lee et al. |
| 2018/0184010 A1 | 6/2018 | Cohen et al. |
| 2018/0196236 A1 | 7/2018 | Ohashi et al. |
| 2018/0196238 A1 | 7/2018 | Goldenberg et al. |
| 2018/0198897 A1 | 7/2018 | Tang et al. |
| 2018/0216925 A1 | 8/2018 | Yasuda et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0241922 A1 | 8/2018 | Baldwin et al. |
| 2018/0249090 A1 | 8/2018 | Nakagawa et al. |
| 2018/0268226 A1 | 9/2018 | Shashua et al. |
| 2018/0295292 A1 | 10/2018 | Lee et al. |
| 2018/0300901 A1 | 10/2018 | Wakai et al. |
| 2018/0307005 A1 | 10/2018 | Price et al. |
| 2018/0329281 A1 | 11/2018 | Ye |
| 2018/0368656 A1 | 12/2018 | Austin et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0089941 A1 | 3/2019 | Bigioi et al. |
| 2019/0094500 A1 | 3/2019 | Tseng et al. |
| 2019/0096047 A1 | 3/2019 | Ogasawara |
| 2019/0100156 A1 | 4/2019 | Chung et al. |
| 2019/0107651 A1 | 4/2019 | Sade |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0154466 A1 | 5/2019 | Fletcher |
| 2019/0155002 A1 | 5/2019 | Shabtay et al. |
| 2019/0170965 A1 | 6/2019 | Shabtay |

(56) References Cited

U.S. PATENT DOCUMENTS

| | | | |
|---|---|---|---|
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0227338 A1 | 7/2019 | Bachar et al. |
| 2019/0228562 A1 | 7/2019 | Song |
| 2019/0235202 A1 | 8/2019 | Smyth et al. |
| 2019/0297238 A1 | 9/2019 | Klosterman |
| 2019/0320119 A1 | 10/2019 | Miyoshi |
| 2019/0353874 A1 | 11/2019 | Yeh et al. |
| 2020/0014912 A1 | 1/2020 | Kytsun et al. |
| 2020/0084358 A1 | 3/2020 | Nadamoto |
| 2020/0092486 A1 | 3/2020 | Guo et al. |
| 2020/0103726 A1 | 4/2020 | Shabtay et al. |
| 2020/0104034 A1 | 4/2020 | Lee et al. |
| 2020/0118287 A1 | 4/2020 | Hsieh et al. |
| 2020/0134848 A1 | 4/2020 | El-Khamy et al. |
| 2020/0162682 A1 | 5/2020 | Cheng et al. |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0264403 A1 | 8/2020 | Bachar et al. |
| 2020/0333691 A1 | 10/2020 | Shabtay et al. |
| 2020/0389580 A1 | 12/2020 | Kodama et al. |
| 2020/0400926 A1 | 12/2020 | Bachar |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0180989 A1 | 6/2021 | Fukumura et al. |
| 2021/0208415 A1 | 7/2021 | Goldenberg et al. |
| 2021/0263276 A1 | 8/2021 | Huang et al. |
| 2021/0333521 A9 | 10/2021 | Yedid et al. |
| 2021/0364746 A1 | 11/2021 | Chen |
| 2021/0368104 A1 | 11/2021 | Bian et al. |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |
| 2022/0252963 A1 | 8/2022 | Shabtay et al. |
| 2022/0368814 A1 | 11/2022 | Topliss et al. |

FOREIGN PATENT DOCUMENTS

| | | |
|---|---|---|
| CN | 201514511 U | 6/2010 |
| CN | 102130567 A | 7/2011 |
| CN | 102147519 A | 8/2011 |
| CN | 102193162 A | 9/2011 |
| CN | 102215373 A | 10/2011 |
| CN | 102466865 A | 5/2012 |
| CN | 102466867 A | 5/2012 |
| CN | 102739949 A | 10/2012 |
| CN | 102147519 B | 1/2013 |
| CN | 102982518 A | 3/2013 |
| CN | 103024272 A | 4/2013 |
| CN | 203406908 U | 1/2014 |
| CN | 103576290 A | 2/2014 |
| CN | 203482298 U | 3/2014 |
| CN | 103698876 A | 4/2014 |
| CN | 103841404 A | 6/2014 |
| CN | 104297906 A | 1/2015 |
| CN | 104407432 A | 3/2015 |
| CN | 105467563 A | 4/2016 |
| CN | 105657290 A | 6/2016 |
| CN | 205301703 U | 6/2016 |
| CN | 105827903 A | 8/2016 |
| CN | 105847662 A | 8/2016 |
| CN | 106680974 A | 5/2017 |
| CN | 104570280 B | 6/2017 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S54157620 A | 12/1979 |
| JP | S59121015 A | 7/1984 |
| JP | S59191146 A | 10/1984 |
| JP | 6165212 A | 4/1986 |
| JP | S6370211 A | 3/1988 |
| JP | H0233117 A | 2/1990 |
| JP | 04211230 A | 8/1992 |
| JP | 406059195 A | 3/1994 |
| JP | H07318864 A | 12/1995 |
| JP | H07325246 A | 12/1995 |
| JP | H07333505 A | 12/1995 |
| JP | 08271976 A | 10/1996 |
| JP | H09211326 A | 8/1997 |
| JP | H11223771 A | 8/1999 |
| JP | 2000292848 A | 10/2000 |
| JP | 3210242 B2 | 9/2001 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2004334185 A | 11/2004 |
| JP | 2005099265 A | 4/2005 |
| JP | 2005122084 A | 5/2005 |
| JP | 2005321592 A | 11/2005 |
| JP | 2006038891 A | 2/2006 |
| JP | 2006191411 A | 7/2006 |
| JP | 2006195139 A | 7/2006 |
| JP | 2006237914 A | 9/2006 |
| JP | 2006238325 A | 9/2006 |
| JP | 2008083377 A | 9/2006 |
| JP | 2007086808 A | 4/2007 |
| JP | 2007133096 A | 5/2007 |
| JP | 2007164065 A | 6/2007 |
| JP | 2007219199 A | 8/2007 |
| JP | 2007228006 A | 9/2007 |
| JP | 2007306282 A | 11/2007 |
| JP | 2008076485 A | 4/2008 |
| JP | 2008111876 A | 5/2008 |
| JP | 2008191423 A | 8/2008 |
| JP | 2008245142 A | 10/2008 |
| JP | 2008271026 A | 11/2008 |
| JP | 2010032936 A | 2/2010 |
| JP | 2010164841 A | 7/2010 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011145315 A | 7/2011 |
| JP | 2011151448 A | 8/2011 |
| JP | 2011203283 A | 10/2011 |
| JP | 2012132739 A | 7/2012 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2016105577 A | 6/2016 |
| JP | 2017116679 A | 6/2017 |
| JP | 2017146440 A | 8/2017 |
| JP | 2018059969 A | 4/2018 |
| JP | 2019113878 A | 7/2019 |
| JP | 2019126179 A | 7/2019 |
| KR | 20070005946 A | 1/2007 |
| KR | 20080088477 A | 10/2008 |
| KR | 20090019525 A | 2/2009 |
| KR | 20090058229 A | 6/2009 |
| KR | 20090131805 A | 12/2009 |
| KR | 20100008936 A | 1/2010 |
| KR | 20110058094 A | 6/2011 |
| KR | 20110080590 A | 7/2011 |
| KR | 20110082494 A | 7/2011 |

(56) References Cited

FOREIGN PATENT DOCUMENTS

| | | |
|---|---|---|
| KR | 20110115391 A | 10/2011 |
| KR | 20120068177 A | 6/2012 |
| KR | 20140135909 A | 5/2013 |
| KR | 20130104764 A | 9/2013 |
| KR | 1020130135805 A | 11/2013 |
| KR | 20140014787 A | 2/2014 |
| KR | 20140023552 A | 2/2014 |
| KR | 101428042 B1 | 8/2014 |
| KR | 101477178 B1 | 12/2014 |
| KR | 20140144126 A | 12/2014 |
| KR | 20150118012 A | 10/2015 |
| KR | 20160000759 A | 1/2016 |
| KR | 101632168 B1 | 6/2016 |
| KR | 20160115359 A | 10/2016 |
| KR | 20170105236 A | 9/2017 |
| KR | 20180120894 A | 11/2018 |
| KR | 20130085116 A | 6/2019 |
| TW | 1407177 B | 9/2013 |
| TW | M602642 U | 10/2020 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2013058111 A1 | 4/2013 |
| WO | 2013063097 A1 | 5/2013 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM Siggraph, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM Siggraph, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Zitova Bet al: "Image Registration Methods: A Survey", Image and Vision Computing, Elsevier, Guildford, GB, vol. 21, No. 11, Oct. 1, 2003 (Oct. 1, 2003), pp. 977-1000, XP00i 189327, ISSN: 0262-8856, DOI: i0_i0i6/ S0262-8856(03)00137-9.
A compact and cost effective design for cell phone zoom lens, Chang et al., Sep. 2007, 8 pages.
Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

* cited by examiner

MINIATURE TELEPHOTO LENS MODULE AND A CAMERA UTILIZING SUCH A LENS MODULE

CROSS REFERENCE TO EXISTING APPLICATIONS

This application is a Continuation application from U.S. patent application Ser. No. 17/389,510 filed Jul. 30, 2021 (now allowed), which was a Continuation application from U.S. patent application Ser. No. 16/276,034 filed Feb. 14, 2019 (now U.S. Pat. No. 11,125,975), which was a Continuation application from U.S. patent application Ser. No. 15/540,676 filed Jun. 29, 2017 (now U.S. Pat. No. 10,288,840), which was a 371 from international patent application No. PCT/IB2015/050044 filed Jan. 3, 2015.

TECHNOLOGICAL FIELD

The present invention is generally in the field of imaging techniques, and relates to a camera and mobile electronic devices utilizing such a camera.

BACKGROUND

Digital camera modules are currently being incorporated into a variety of portable electronic devices. Such devices include for example mobile phones (e.g. smartphones), personal data assistants (PDAs), computers, and so forth. Digital camera modules for use in portable devices have to meet certain requirements such as good quality imaging, small footprint, as well as low weight.

Several techniques for small digital camera modules providing good quality imaging are described in WO14083489 and WO14199338, both assigned to the assignee of the present application.

According to the technique described in WO14083489, a multi-aperture imaging system comprises a first camera with a first sensor that captures a first image and a second camera with a second sensor that captures a second image. The two cameras have either identical or different FOVs. Either image may be chosen to be a primary or an auxiliary image, based on a zoom factor. An output image with a point of view determined by the primary image is obtained by registering the auxiliary image to the primary image.

The technique described in WO14199338 relates to a dual-aperture zoom digital camera operable in both still and video modes. The camera includes Wide and Tele imaging sections with respective lens/sensor combinations and image signal processors and a camera controller operatively coupled to the Wide and Tele imaging sections. The controller is configured to combine in still mode at least some of the Wide and Tele image data to provide a fused output image from a particular point of view, and to provide, without fusion, continuous zoom video mode output images, each output image having a given output resolution. The video mode output images are provided with a smooth transition when switching between a lower zoom factor (ZF) value and a higher ZF value or vice versa. At the lower ZF the output resolution is determined by the Wide sensor, while at the higher ZF value the output resolution is determined by the Tele sensor.

General Description

There is a need in the art for a novel camera module for use in modern portable electronic devices, such as smart phones, laptops, notepads, etc.

As noted above, the requirements for the camera modules for use in such devices are related to the size, weight and image quality of the camera. Moreover, these requirements become more essential when the camera module is to be installed within the portable device, unlike other external camera units attachable to the portable device. In the case of an internal (integral) camera unit, the dimensions of the camera optics should be as small as possible in order to be suitable to operate with commonly used detectors and to fit the thickness of the device in which the camera is installed (preferably without protruding from the device's casing), while the trend in such devices is to reduce the thickness as much as possible.

This problem is even more crucial when using, in a portable device, a lens with a long length with a fixed and relatively high zooming effect. Considering for example the dual-aperture zoom digital camera described in above-indicated publications WO14083489 and WO14199338 mentioned above, it utilizes Wide and Tele imaging channels which provide advanced imaging capabilities such as zoom and image quality by image fusion between the two channels.

One of the problems with dual-aperture zoom cameras relates to the dimensions (heights) of Wide and Tele cameras along the optical axis. Such dimensions depend on total track lengths (TTLs) of the Tele and Wide lenses used in the respective imaging channels.

As schematically illustrated in FIG. 1B, the TTL is typically defined as the maximal distance between the object-side surface of the lens module and an image plane IP defined by such a lens module (where the sensing surface of a camera detector is placed). In most miniature lenses, the TTL is larger than the effective focal length (EFL) of the lens module, which is equal to the distance between the effective principal plane of the lens and its focal plane (which substantially coincides with image plane IP).

With regard to the term effective principal plane, the following should be understood. Generally, the lens (or lens module) has front and rear principal planes, which have the property that a ray emerging from the lens appears to have crossed the rear principal plane at the same distance from the axis that that ray appeared to cross the front principal plane, as viewed from the front of the lens. This means that the lens can be treated as if all of the refraction occurred at the principal planes. The principal planes are crucial in defining the optical properties of the system, since it is the distance of the object and image from the front and rear principal planes that determine the magnification of the system. The principal points are the points where the principal planes cross the optical axis.

Considering dual-aperture optical zoom in a mobile phone (e.g. a smartphone) with the typically used lenses, i.e. typical TTL/EFL ratio of about 1.3, the Wide and Tele lenses would have TTLs of about 4.55 mm and 9.1 mm, respectively. This will result in undesirably long camera modules for use in such a smartphone device.

Further, the difference in the TTLs of the Wide and Tele lens modules can cause shadowing and light-blocking problems. Reference is made to FIG. 1A schematically illustrating that part of incoming light incident on the "higher" lens does not reach the "shorter" lens. In this connection, one should keep in mind that a distance between the Tele and Wide lens modules should be as small as possible to meet the overlapping/common FOVs as well as footprint requirements for the camera unit in a portable device.

Another part of the presently disclosed subject matter is associated with the implementation of standard optical image stabilization (OIS) in a dual-aperture zoom camera. Standard OIS compensates for camera tilt ("CT") by a parallel-to-the image sensor (exemplarily in the X-Y plane) lens movement ("LMV"). Camera tilt causes image blur. The amount of LMV (in mm) needed to counter a given camera tilt depends on the cameras lens EFL, according to the relation LMV=CT*EFL where "CT" is in radians and EFL is in mm. Since, as shown above, a dual-aperture zoom camera may include two lenses with significantly different EFLs, it is impossible to move both lenses together and achieve optimal tilt compensation for both Tele and Wide cameras. That is, since the tilt is the same for both cameras, a movement that will cancel the tilt for the Wide camera will be insufficient to cancel the tilt for the Tele camera. Similarly, a movement that will cancel the tilt for the Tele camera will over-compensate the tilt cancellation for the Wide camera. Assigning a separate OIS actuator to each camera can achieve simultaneous tilt compensation, but at the expense of a complicated and costly camera system.

Thus, for both a single-aperture or multi-aperture (dual) camera unit, the use of a telephoto lens would be advantageous, as such a telephoto lens provides reduced TTL while enabling to maintain the relatively high EFL required for the Tele lens, i.e. for telephoto lens TTL<EFL. However, the dimensions of conventional lenses in which the telephoto condition is satisfied do not allow them to be used as integral lenses fully embedded in a thin portable device. The telephoto lens module, in order to be used as an integral lens in a modern portable device, has to satisfy the telephoto condition (i.e. TTL<EFL) while the lens module is to be as short as possible (along the optical path of light passing through it) allowing it to be fully fitted within the portable device casing.

Accordingly, a miniature telephoto lens module is disclosed which is designed with the desired dimensions to enable its integration within a portable device. According to some examples of the presently disclosed subject matter, the miniature telephoto lens module (or telephoto lens unit) is designed to be completely integrated within the casing of a conventional Smartphone, i.e. without protruding therefrom. The disclosed telephoto lens module has a total track lens (TTL) smaller than an effective focal lens (EFL) thereof, and is configured such that its dimension along the optical axis is desirably small, i.e. about 4-15 mm or less (e.g. suitable to be fitted in a portable device having a casing as small as 4 mm).

The telephoto lens unit comprises multiple lens elements made of at least two different polymer materials having different Abbe numbers. The multiple lens elements comprise a first group of at least three lens elements being a telephoto lens assembly, and a second group of at least two lens elements being a field lens assembly.

The first group of lens elements comprises, in order from the object plane to the image plane along an optical axis of the telephoto lens unit: a first lens having positive optical power and a pair of second and third lenses having together negative optical power such that said telephoto lens assembly provides a telephoto optical effect of said telephoto lens unit and wherein said second and third lenses are each made of one of said at least two different polymer materials having a different Abbe number, for reducing chromatic aberrations of said telephoto lens. The second group of lens elements is configured to correct field curvature of said telephoto lens assembly, and said field lens module comprises two or more of said lens elements made of the different polymer materials respectively having different Abbe numbers, and configured to compensate for residual chromatic aberrations of said telephoto lens assembly dispersed during light passage through an effective gap located between the telephoto and field lens assemblies. The effective gap is larger than ⅕ of the TTL of the telephoto lens unit, thereby allowing sufficient field separation for reducing chromatic aberration.

Various examples disclosed herein include an optical lens unit comprising, in order from an object side to an image side: a first lens element with positive refractive power having a convex object-side surface, a second lens element with negative refractive power having a thickness $d_2$ on an optical axis and separated from the first lens element by a first air gap, a third lens element with negative refractive power and separated from the second lens element by a second air gap, a fourth lens element having a positive refractive power and separated from the third lens element by an effective third air gap, and a fifth lens element having negative refractive power, separated from the fourth lens element by an effective fourth air gap, the fifth lens element having a thickness $d_5$ on the optical axis.

An optical lens unit may further include a stop, positioned before the first lens element, a glass window disposed between the image-side surface of the fifth lens element and an image sensor with an image plane on which an image of the object is formed.

Each lens element has two surfaces, each surface having a respective diameter. The largest diameter among all lens elements is defined as an "optical diameter" of the lens assembly.

As disclosed herein, TTL is defined as the distance on an optical axis between the object-side surface of the first lens element and an image plane where the image sensor is placed. "EFL" has its regular meaning, as mentioned above. In all embodiments, TTL is smaller than the EFL, i.e. the TTL/EFL ratio is smaller than 1.0. In some embodiments, the TTL/EFL ratio is smaller than 0.9. In an embodiment, the TTL/EFL ratio is about 0.85. According to some examples the lens assembly has an F number F #<3.2.

According to an example disclosed herein, the focal length of the first lens element f1 is smaller than TTL/2, the first, third and fifth lens elements have each an Abbe number ("Vd") greater than 50, the second and fourth lens elements have each an Abbe number smaller than 30, the first air gap is smaller than $d_2/2$, the effective third air gap is greater than TTL/5 and the effective fourth air gap is smaller than $1.5d_5$TTL/50. In some embodiments, the surfaces of the lens elements may be aspheric.

In the optical lens unit mentioned above, the first lens element with positive refractive power allows the TTL of the lens unit to be favorably reduced. The combined design of the first, second and third lens elements plus the relative short distances between them enable a long EFL and a short TTL. The same combination, together with the high dispersion (low Vd) for the second lens element and low dispersion (high Vd) for the first and third lens elements, also helps to reduce chromatic aberration. In particular, the ratio TTL/EFL<1.0 and minimal chromatic aberration are obtained by fulfilling the relationship $1.2 \times |f3| > |f2| > 1.5 \times f1$, where "f" indicates the lens element effective focal length and the numerals 1, 2, 3, 4, 5 indicate the lens element number.

The relatively large effective gap between the third and the fourth lens elements plus the combined design of the fourth and fifth lens elements assist in bringing all fields' focal points to the image plane. Also, because the fourth and fifth lens elements have different dispersions and have respectively positive and negative power, they help in minimizing chromatic aberration.

The telephoto lens module disclosed herein may be advantageously adapted to be incorporated in a mobile phone camera that uses a typical ¼' or ⅓' image sensor. For example, to be competitive with known mobile phone cameras with ¼' image sensors, it would be advantageous for the TTL of the telephoto lens module to be smaller than 5.5 mm and the largest lens diameter to be smaller than 4 mm. To be competitive with known mobile phone cameras with ⅓' image sensors, it would be advantageous for the TTL of the telephoto lens module to be smaller than 6.5 mm and the largest lens diameter to be smaller than 5 mm.

Accordingly to an example of the presently disclosed subject matter there is provided an optical lens unit configured to provide an image on an entire area of a ¼" image sensor, the lens unit comprising five lens elements and having a TTL smaller than 5.5 mm, an EFL larger than 5.9 mm, and an optical diameter smaller than 4 mm.

Accordingly in another example of the presently disclosed subject matter there is provided an optical lens unit operative to provide an image on an entire area of a ⅓" image sensor, the lens unit comprising five lens elements and having a TTL smaller than 6.2 mm, an EFL larger than 6.8 mm, and an optical diameter smaller than 5 mm.

Also, as mentioned above, according to the presently disclosed subject matter it is suggested to have all lens elements made of polymer material such as plastic. While lenses made of polymer material are advantageous for reducing the price tag of the telephoto lens module as well as its weight, there are very few polymer materials which are suitable for this purpose. This is different to glass lenses which can be made of a variety of different glass materials, each characterized by a different Abbe number. The scarcity in polymer materials presents a challenge when designing lenses for a telephoto lens module. This challenge is at least partly due to the limitation in possible combinations of different lenses with different Abbe numbers which can be used for the purpose of correcting field curvature and compensating for chromatic aberrations.

Thus, according to one aspect of the presently disclosed subject matter there is provided a mobile electronic device comprising an integrated camera, wherein the camera comprises a Wide camera unit comprising a Wide lens unit, and a Telephoto camera unit comprising a telephoto lens unit, the telephoto lens unit and the wide lens unit having respectively TTL/EFL ratios smaller and larger than 1 and defining separate telephoto and wide optical paths.

In addition to the above features, the mobile electronic device according to this aspect of the presently disclosed subject matter can optionally comprise one or more of features (i) to (xvi) below, in any desired combination or permutation:

(i). wherein light receiving outer surfaces of the Wide and Telephoto lens units are located substantially in the same plane, thereby reducing shadowing and light blocking effects therebetween.
(ii). wherein the Wide and Telephoto camera units are mounted on separate printed circuit boards.
(iii). wherein the printed circuit boards are located in different spaced-apart substantially parallel planes.
(iv). wherein the Wide and Telephoto camera units are mounted directly on a single printed circuit board.
(v). wherein the Wide and Telephoto camera units are spaced from one another a distance d of about 1 mm.
(vi). wherein the telephoto lens unit is made of at least two polymer materials.
(vii). wherein the telephoto lens has a total track lens (TTL) not exceeding 15 mm.
(viii). wherein the telephoto lens has TTL less than 10 mm.
(ix). wherein the telephoto lens unit comprises multiple lens elements made of at least two different polymer materials having different Abbe numbers, the multiple lens elements comprise a first group of at least three lens elements configured to form a telephoto lens assembly, and a second group of at least two lens elements configured to form a field lens assembly, wherein the field lens assembly is spaced from the telephoto lens assembly by a predetermined effective gap.
(x). wherein said at least two different polymer materials comprise at least one plastic material with the Abbe number larger than 50, and at least one plastic material with the Abbe number smaller than 30.
(xi). wherein the first group of lens elements comprises, in order from an object plane to an image plane along an optical axis of the telephoto lens unit: a first lens having positive optical power and a pair of second and third lenses having together negative optical power such that said telephoto lens assembly provides telephoto optical effect of said telephoto lens unit, and said second and third lenses are each made of one of said at least two different polymer materials having a different Abbe number, for reducing chromatic aberrations of said telephoto lens; and
the second group of lens elements is configured to correct field curvature of said telephoto lens assembly, and comprises two or more of said lens elements made of the different polymer materials respectively having different Abbe numbers, and configured to compensate for residual chromatic aberrations of said telephoto lens assembly dispersed during light passage through said effective gap between the telephoto and field lens assemblies.
(xii). wherein the first, third and fifth lens elements have each an Abbe number greater than 50, and the second and fourth lens elements have each an Abbe number smaller than 30.
(xiii). wherein the predetermined effective gap is equal to or larger than ⅕ of the TTL of the telephoto lens unit.
(xiv). wherein the lens elements of the field lens assembly are spaced from one another an effective air gap smaller than 1/50 of the TTL of the telephoto lens unit.
(xv). wherein the telephoto lens unit has a TTL smaller than 5.5 mm, an effective focal length (EFL) larger than 5.9 mm, and an optical diameter smaller than 4 mm, thereby enabling to provide an image on an entire area of a ¼" image sensor.
(xvi). wherein the telephoto lens unit has a TTL smaller than 6.2 mm, an effective focal length (EFL) larger than 6.8 mm, and an optical diameter smaller than 5 mm, thereby enabling to provide an image on an entire area of a ⅓" image sensor.

According to another aspect of the presently disclosed subject matter there is provided a camera for integrating in a mobile electronic device, the camera comprising a Wide camera unit and a Telephoto camera unit comprising respectively a wide lens unit and a telephoto lens unit having TTL/EFL ratios larger and smaller than 1, respectively, and defining wide and telephoto optical paths.

Wherein according to some examples the lens elements of at least the telephoto lens unit are made of one or more polymer materials.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
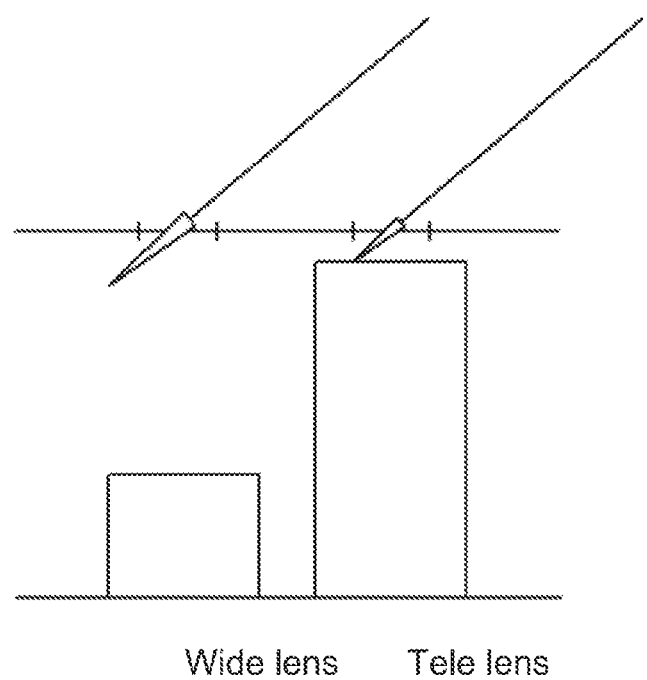
FIG. 1A is a schematic illustration demonstrating shadowing and light-blocking problems caused by height differences between Wide and Tele cameras in a dual-aperture camera.
Figure 1B:
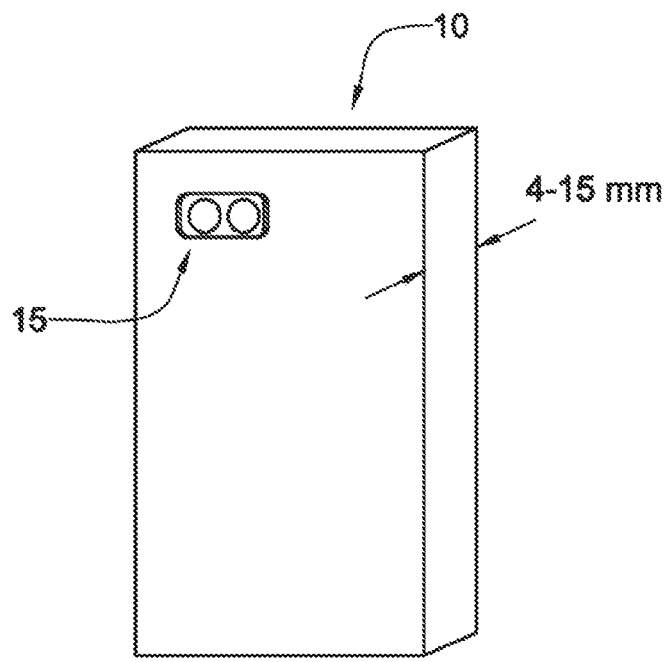
FIG. 1B is a schematic illustration of a mobile phone device (constituting a portable electronic device) utilizing a camera unit as disclosed herein which is fully integrated inside the smartphone device.

The present invention includes novel configuration of a lens unit in a portable camera, advantageously applicable in a portable electronic device. This is schematically illustrated in FIG. 1B. In this example, such a portable electronic device 10 is constituted by a mobile phone device (e.g. smartphone). The mobile device is typically a few millimeters thick, e.g. 4 mm-15 mm.

However, as explained above and exemplified further below, the problems solved by the technique disclosed herein are relevant for any modern electronic device equipped with a camera 15 and suitable to be implemented in any such device. This is so since any modern electronic device of the kind specified (i.e. a device including an integral camera unit) is to be as slim as possible, as light as possible, and is to acquire pictures with as good quality as possible.

Modern cameras typically require zooming functions. When such a camera is used in an electronic device, such as a mobile phone device, the zooming function is often implemented with static optics. The problems which may arise when trying to incorporate Wide and Tele lenses into a common housing due to the difference in their heights are described above with reference to FIG. 1A.

As mentioned above, the presently disclosed subject matter includes a novel mobile electronic device 10 which includes an integrated camera unit 15 which is mounted inside the device casing 14. The camera 15 includes at least one telephoto lens unit (not shown here) which is made of polymer materials. The telephoto lens unit is configured such that its total track lens (TTL) is less than 15 mm and even less than 10 mm, e.g. less than 6 mm or even less than 4 mm. Thus, enabling the camera to be fully integrated in the portable device (substantially not protruding from the device casing).

Figure 1C:
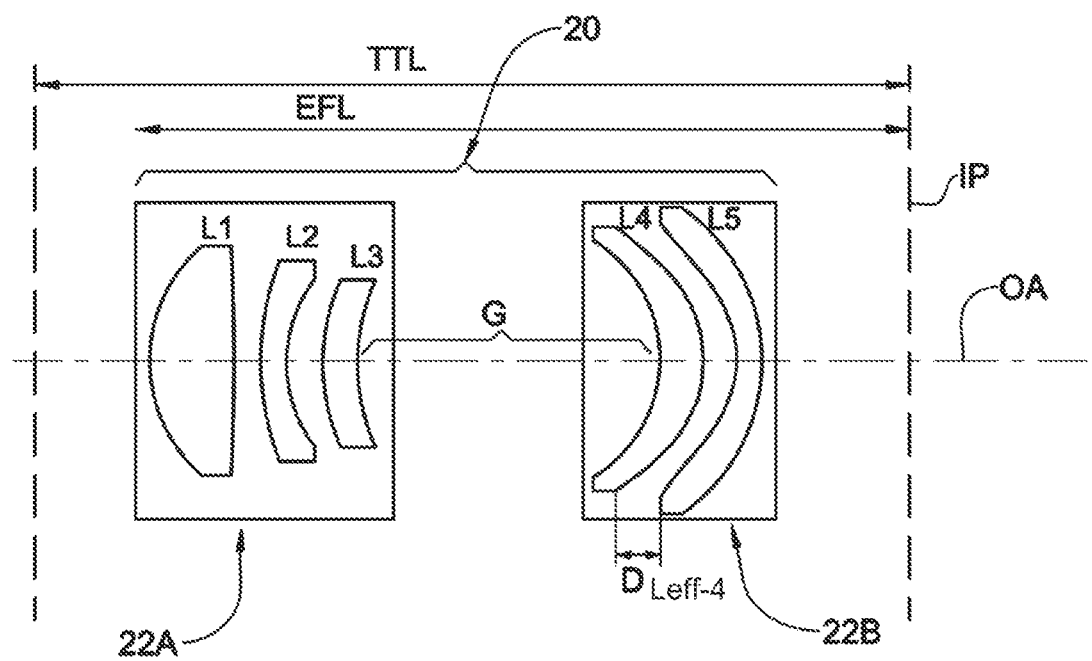
FIG. 1C is a schematic illustration of a telephoto lens unit according to the presently disclosed subject matter.

Reference is made to FIG. 1C showing schematically the configuration of a telephoto lens unit 20 of the present invention. The telephoto lens unit 20 is composed of multiple lens elements made of different polymer materials, i.e. materials having different Abbe numbers. The multiple lens elements are configured and arranged to define a telephoto lens assembly 22A and a field lens assembly 22B arranged along an optical axis OA with a predetermined effective gap G between them (as will be described more specifically further below). The telephoto lens assembly 22A is configured to provide the telephoto optical effect of the telephoto lens unit 20. The field lens assembly 22B spaced from the telephoto lens assembly 22A by the predetermined effective gap G is configured for correcting field curvature of the telephoto lens assembly 22A and to compensate for residual chromatic aberrations of the telephoto lens assembly dispersed during light passage through the effective gap G.

The telephoto lens unit 20 is characterized by a total track lens (TTL) and an effective focal lens (EFL) such that TTL<EFL. This will be exemplified further below. According to the invention, the effective gap G between assemblies 22A and 22B is selected to be larger than TTL/5 of the telephoto lens unit 22A, thereby enabling correction of field curvature of telephoto lens assembly 22A by the field lens assembly 22B.

The telephoto lens assembly 22A includes three lens elements (generally three or more) L1, L2, L3 (which are shown here schematically and not to scale), where lens L1 has positive optical power and lenses L2 and L3 have together negative optical power. Lenses L2 and L3 are made of the first polymer material having a first Abbe number selected for reducing chromatic aberrations of the telephoto lens assembly 22A. The field lens assembly 22B includes two (or more) lens elements L4 and L5 which are made of different polymer materials respectively having different Abbe numbers. These lenses are configured to compensate for residual chromatic aberrations of the telephoto lens assembly 22A dispersed during light passage through the effective gap G between the 22A and 22B.

Lenses L1-L5 can be made for example of two plastic materials, one having an Abbe number greater than 50 and the other—smaller than 30. For example, Lenses L1, L3 and L5 are made of plastic with an Abbe number greater than 50, and lenses L2 and L4 are made of plastic having an Abbe number smaller than 30.

The following are several specific, but non-limiting, examples of the implementation and operation of the telephoto lens unit of the invention described above with reference to FIG. 1C. In the following description, the shape (convex or concave) of a lens element surface is defined as viewed from the respective side (i.e. from an object side or from an image side).

Figure 2A:
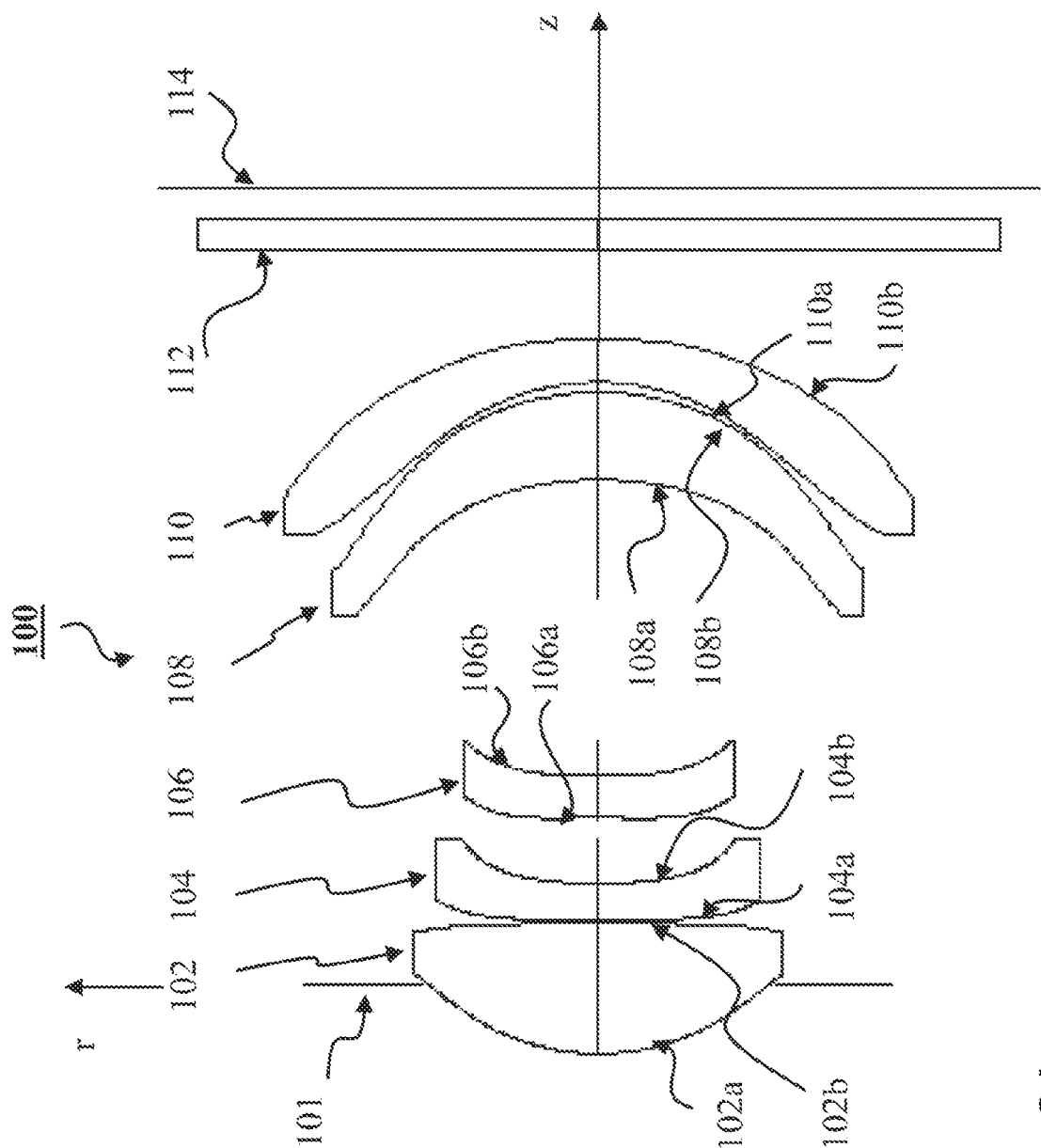
FIG. 2A is a schematic illustration of a specific configuration of the telephoto lens unit, according to a first example of the presently disclosed subject matter.
Figure 2B:
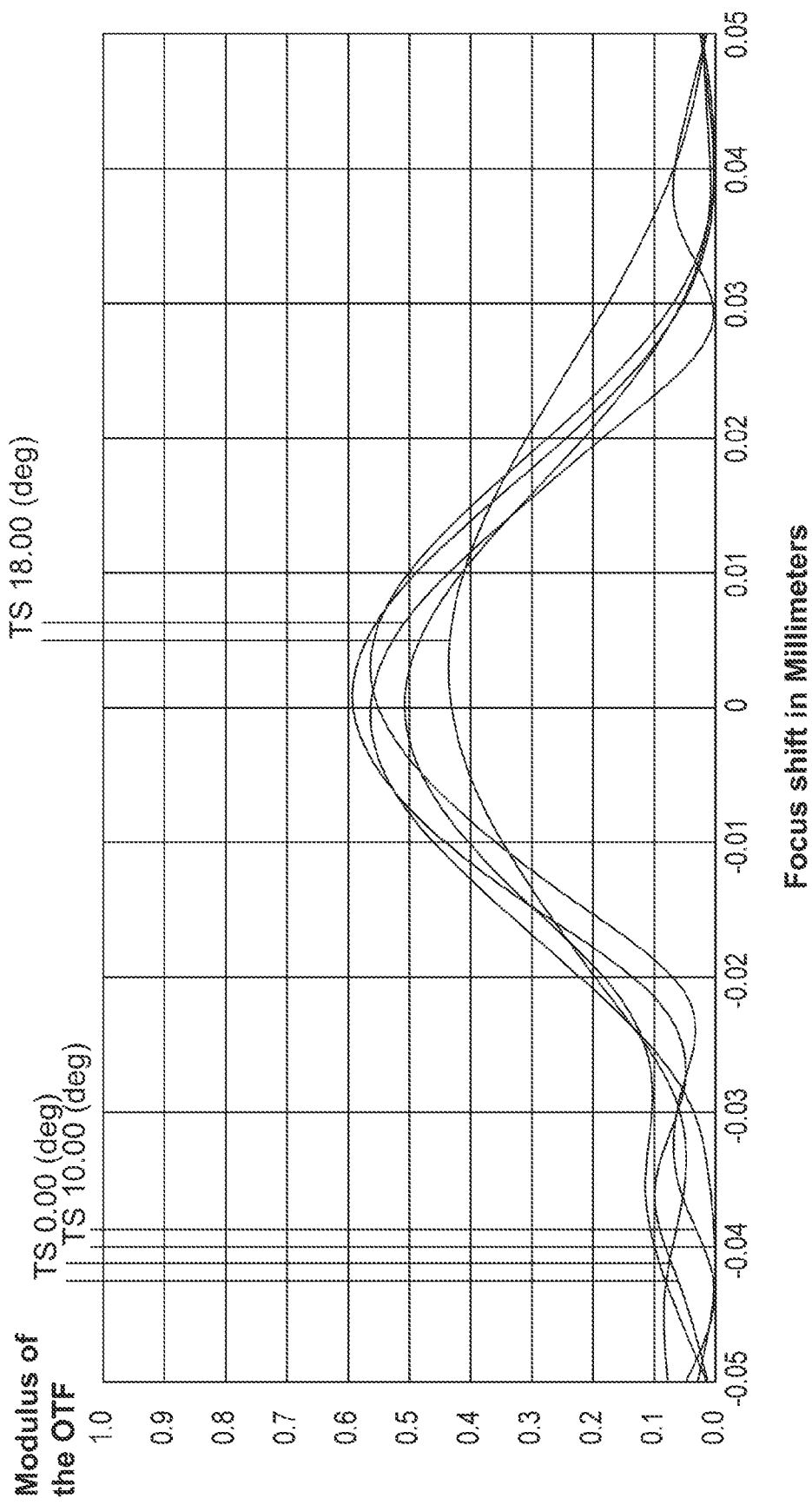
FIG. 2B shows a graph plotting the modulus of the optical transfer function (MTF) vs. focus shift of the entire optical lens unit of FIG. 2A for various fields.
Figure 2C:
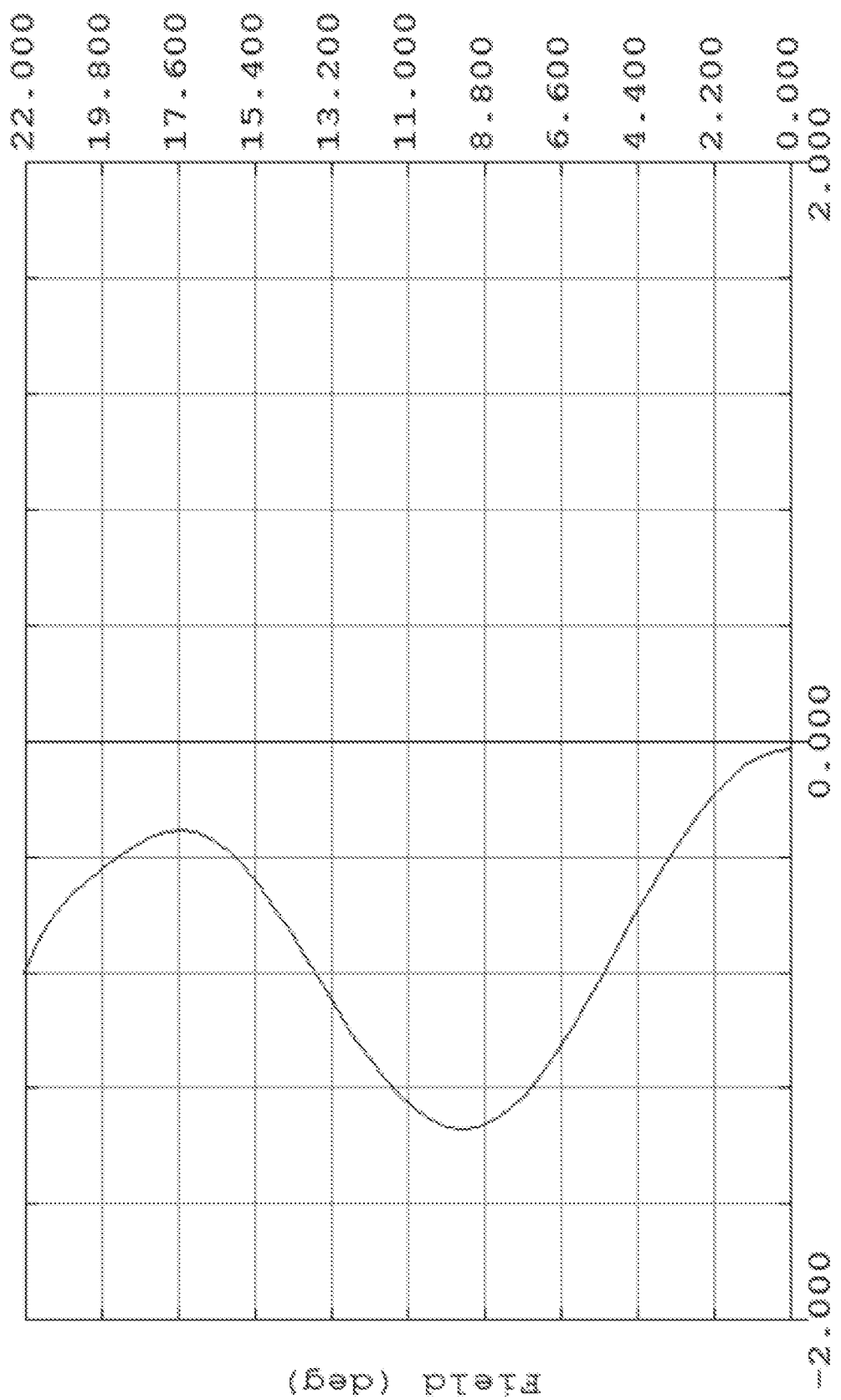
FIG. 2C shows a graph plotting the distortion vs. field angle (+Y direction) for the lens unit of FIG. 2A.

FIG. 2A shows a schematic illustration of an optical lens unit 100, according to a first example of the presently disclosed subject matter. FIG. 2B shows the MTF vs. focus shift of the entire optical lens unit for various fields in the lens unit configuration 100. FIG. 2C shows the distortion +Y in percent vs. field.

According to the example illustrated in FIG. 2A, lens unit 100 includes, in order from an object side to an image side, a first plastic lens element 102 (also referred to as "L1") with positive refractive power having a convex object-side surface 102a and a convex or concave image-side surface 102b; a second plastic lens element 104 (also referred to as "L2") with negative refractive power and having a meniscus convex object-side surface 104a, with an image side surface marked 104b; a third plastic lens element 106 (also referred to as "L3") with negative refractive power having a concave object-side surface 106a with an inflection point and a concave image-side surface 106b. These lens elements define together the telephoto lens assembly (22A in FIG. 1C). Further provided in lens unit 100 is a fourth plastic lens element 108 (also referred to as "L4") with positive refractive power having a positive meniscus, with a concave object-side surface marked 108a and an image-side surface marked 108b; and a fifth plastic lens element 110 (also referred to as "L5") with negative refractive power having a negative meniscus, with a concave object-side surface marked 110a and an image-side surface marked 110b. These two lenses define together the field lens assembly (22B in FIG. 1C). The optical lens unit 100 may further optionally include a stop element 101. The telephoto lens unit 100 defines an image plane 114 in which image sensor(s) is/are located, which is not shown here. Also, as exemplified in the figure, an optional glass window 112 is disposed between the image-side surface 110b of fifth lens element 110 and the image plane 114.

In the example of the telephoto lens unit 100, all lens element surfaces are aspheric. Detailed optical data is shown in Table 1, and aspheric surface data is shown in Table 2, wherein the units of the radius of curvature (R), lens element thickness and/or distances between elements along the optical axis and diameter are expressed in mm. "Nd" is the refraction index. The equation of the aspheric surface profiles is expressed by:

$$z = \frac{cr^2}{1 + \sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14}$$

where r is the distance from (and is perpendicular to) the optical axis, k is the conic coefficient, c=1/R where R is the radius of curvature, and $\alpha$ are coefficients given in Table 2.

In the equation above as applied to the telephoto lens unit, coefficients $\alpha_1$ and $\alpha_7$ are zero. It should be noted that the maximum value of r "max r"=Diameter/2. It should also be noted that in Table 1 (and in Tables 3 and 5 below), the distances between various elements (and/or surfaces) are marked "Lmn" (where m refers to the lens element number, n=1 refers to the element thickness and n=2 refers to the air gap to the next element) and are measured on the optical axis z, wherein the stop is at z=0. Each number is measured from the previous surface. Thus, the first distance-0.466 mm is measured from the stop to surface 102a, the distance L11 from surface 102a to surface 102b (i.e. the thickness of first lens element 102) is 0.894 mm, the air gap L12 between surfaces 102b and 104a is 0.020 mm, the distance L21 between surfaces 104a and 104b (i.e. thickness d2 of second lens element 104) is 0.246 mm, etc. Also, L21=$d_2$ and L51=$d_5$. The lens elements in Tables 1 and 2 (as well as in Tables 3-6) are designed to provide an image on an entire ⅓" sensor having dimensions of approximately 4.7×3.52 mm. The optical diameter in all of these lens assemblies is the diameter of the second surface of the fifth lens element.

TABLE 1

| # | Comment | Radius R [mm] | Distances [mm] | Nd/Vd | Diameter [mm] |
|---|---------|---------------|----------------|-------|---------------|
| 1 | Stop | Infinite | −0.466 | | 2.4 |
| 2 | L11 | 1.5800 | 0.894 | 1.5345/57.095 | 2.5 |
| 3 | L12 | −11.2003 | 0.020 | | 2.4 |
| 4 | L21 | 33.8670 | 0.246 | 1.63549/23.91 | 2.2 |
| 5 | L22 | 3.2281 | 0.449 | | 1.9 |
| 6 | L31 | −12.2843 | 0.290 | 1.5345/57.095 | 1.9 |
| 7 | L32 | 7.7138 | 2.020 | | 1.8 |
| 8 | L41 | −2.3755 | 0.597 | 1.63549/23.91 | 3.3 |
| 9 | L42 | −1.8801 | 0.068 | | 3.6 |
| 10 | L51 | −1.8100 | 0.293 | 1.5345/57.095 | 3.9 |
| 11 | L52 | −5.2768 | 0.617 | | 4.3 |
| 12 | Window | Infinite | 0.210 | 1.5168/64.17 | 3.0 |
| 13 | | Infinite | 0.200 | | 3.0 |

TABLE 2

| # | Conic coefficient k | $\alpha_2$ | $\alpha_3$ | $\alpha_4$ | $\alpha_5$ | $\alpha_6$ |
|---|---------------------|-----------|-----------|-----------|-----------|-----------|
| 2 | −0.4668 | 7.9218E−03 | 2.3146E−02 | −3.3436E−02 | 2.3650E−02 | −9.2437E−03 |
| 3 | −9.8525 | 2.0102E−02 | 2.0647E−04 | 7.4394E−03 | −1.7529E−02 | 4.5206E−03 |
| 4 | 10.7569 | −1.9248E−03 | 8.6003E−02 | 1.1676E−02 | −4.0607E−02 | 1.3545E−02 |
| 5 | 1.4395 | 5.1029E−03 | 2.4578E−01 | −1.7734E−01 | 2.9848E−01 | −1.3320E−01 |
| 6 | 0.0000 | 2.1629E−01 | 4.0134E−02 | 1.3615E−02 | 2.5914E−03 | −1.2292E−02 |
| 7 | −9.8953 | 2.3297E−01 | 8.2917E−02 | −1.2725E−01 | 1.5691E−01 | −5.9624E−02 |
| 8 | 0.9938 | −1.3522E−02 | −7.0395E−03 | 1.4569E−02 | −1.5336E−02 | 4.3707E−03 |
| 9 | −6.8097 | −1.0654E−01 | 1.2933E−02 | 2.9548E−04 | −1.8317E−03 | 5.0111E−04 |

TABLE 2-continued

| # | Conic coefficient k | $\alpha_2$ | $\alpha_3$ | $\alpha_4$ | $\alpha_5$ | $\alpha_6$ |
|---|---|---|---|---|---|---|
| 10 | −7.3161 | −1.8636E−01 | 8.3105E−02 | −1.8632E−02 | 2.4012E−03 | −1.2816E−04 |
| 11 | 0.0000 | −1.1927E−01 | 7.0245E−02 | −2.0735E−02 | 2.6418E−03 | −1.1576E−04 |

Lens unit 100 provides a field of view (FOV) of 44 degrees, with EFL=6.90 mm, F #=2.80 and TTL of 5.904 mm. Thus and advantageously, the ratio TTL/EFL=0.855. Advantageously, the Abbe number of the first, third and fifth lens element is 57.095. Advantageously, the first air gap between lens elements 102 and 104 (the gap between surfaces 102b and 104a) has a thickness (0.020 mm) which is less than a tenth of thickness $d_2$ (0.246 mm). Advantageously, the Abbe number of the second and fourth lens elements is 23.91. Advantageously, an effective third air gap G (see below with reference to Table 9) between lens elements 106 and 108 (i.e. the telephoto and field lens assemblies) is greater than TTL/5. Advantageously, an effective fourth air gap (see below with reference to Table 9) between lens elements 108 and 110 is smaller than TTL/50.

The focal length (in mm) of each lens element in lens unit 100 is as follows: f1=2.645, f2=−5.578, f3=−8.784, f4=9.550 and f5=−5.290. The condition 1.2×|f3|>|f2|>1.5×f1 is clearly satisfied, as 1.2×8.787>5.578>1.5×2.645. f1 also fulfills the condition f1<TTL/2, as 2.645<2.952.

Figure 3A:
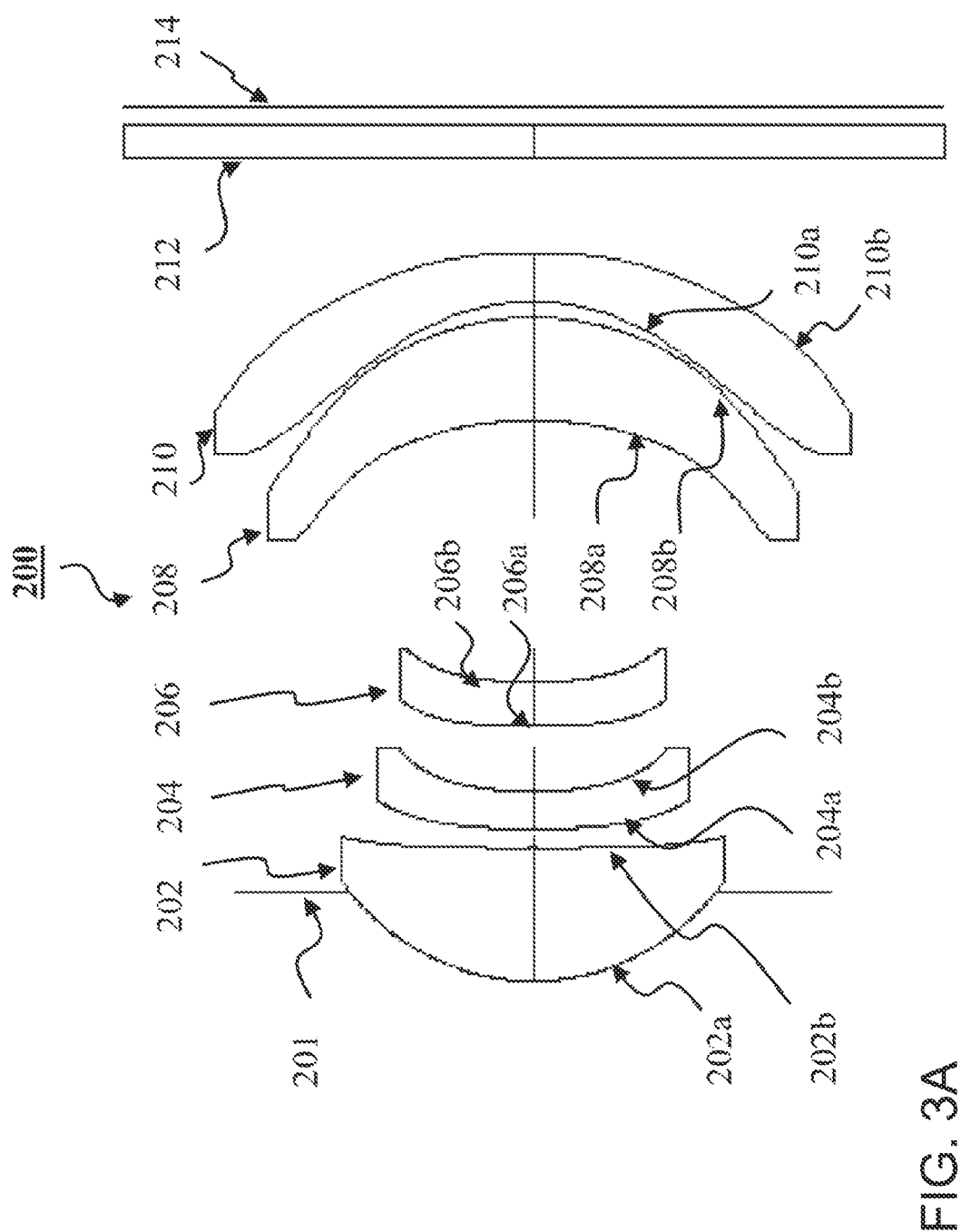
FIG. 3A is a schematic illustration of another possible configuration of the telephoto lens unit, according to a first example of the presently disclosed subject matter.
Figure 3B:
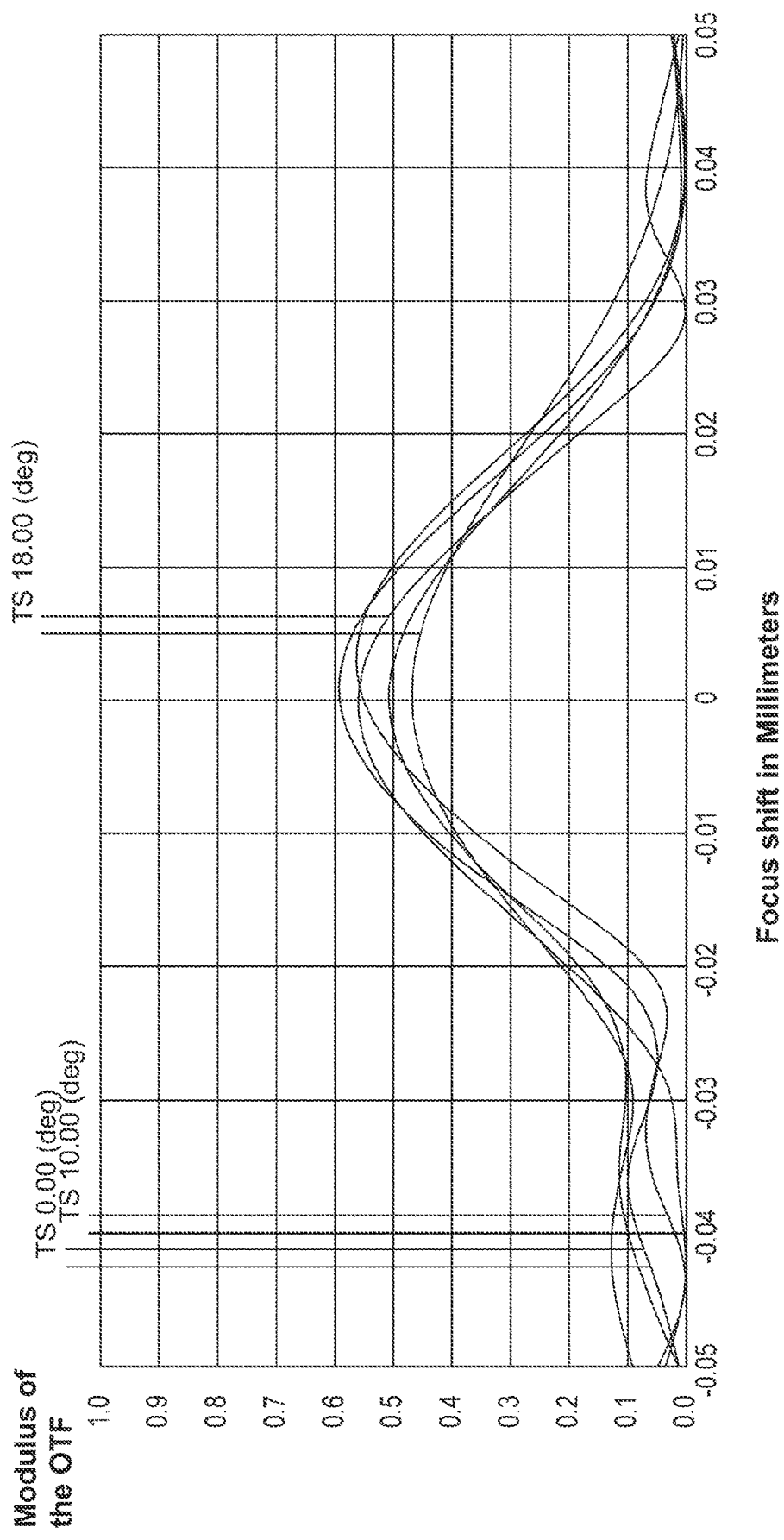
FIG. 3B shows a graph plotting the MTF vs. focus shift of the entire optical lens assembly for various fields in the lens unit of FIG. 3B, according to the second example of the presently disclosed subject matter.
Figure 3C:
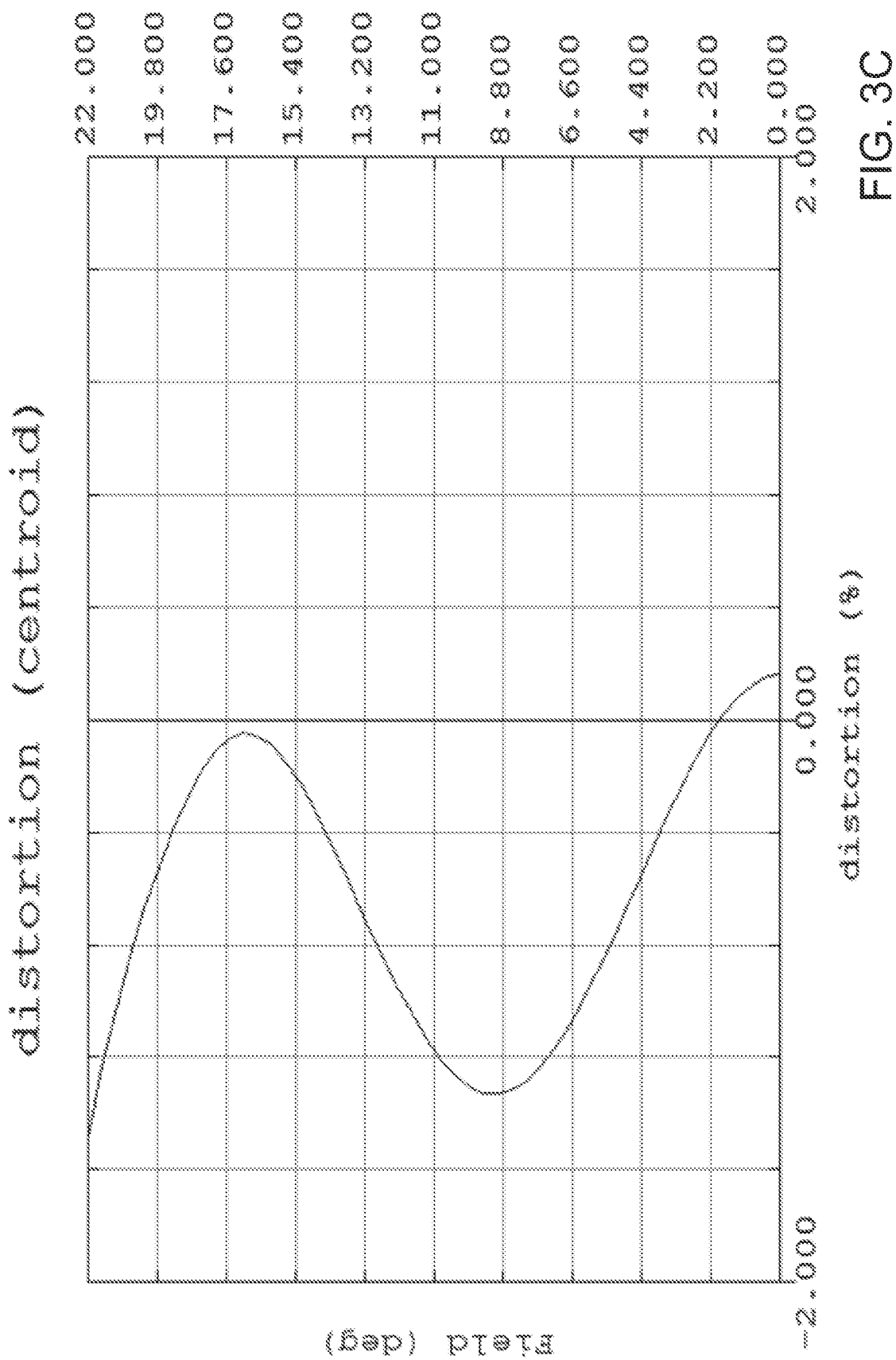
FIG. 3C shows a graph plotting the distortion +Y in percent for the lens unit of FIG. 3A.

FIG. 3A shows a schematic illustration of an optical lens unit 200, according to another example of the presently disclosed subject matter. FIG. 3B shows the MTF vs. focus shift of the entire optical lens system for various fields in embodiment 200. FIG. 3C shows the distortion +Y in percent vs. field.

According to the example illustrated in FIG. 3A, lens unit 200 comprises, in order from an object side to an image side: an optional stop 201; a telephoto lens assembly including a first plastic lens element 202 with positive refractive power having a convex object-side surface 202a and a convex or concave image-side surface 202b, a second plastic lens element 204 with negative refractive power, having a meniscus convex object-side surface 204a, with an image side surface marked 204b, and a third plastic lens element 206 with negative refractive power having a concave object-side surface 206a with an inflection point and a concave image-side surface 206b; and a field lens assembly including a fourth plastic lens element 208 with positive refractive power having a positive meniscus, with a concave object-side surface marked 208a and an image-side surface marked 208b, and a fifth plastic lens element 210 with negative refractive power having a negative meniscus, with a concave object-side surface marked 110a and an image-side surface marked 210b. The optical lens unit 200 further optionally includes a glass window 212 disposed between the image-side surface 210b of fifth lens element 210 and an image plane 214.

In the lens unit 200, all lens element surfaces are aspheric. Detailed optical data is given in Table 3, and the aspheric surface data is given in Table 4, wherein the markings and units are the same as in, respectively, Tables 1 and 2. The equation of the aspheric surface profiles is the same as for lens unit 100 described above.

TABLE 3

| # | Comment | Radius R [mm] | Distances [mm] | Nd/Vd | Diameter [mm] |
|---|---|---|---|---|---|
| 1 | Stop | Infinite | −0.592 | | 2.5 |
| 2 | L11 | 1.5457 | 0.898 | 1.53463/56.18 | 2.6 |
| 3 | L12 | −127.7249 | 0.129 | | 2.6 |
| 4 | L21 | 6.6065 | 0.251 | 1.91266/20.65 | 2.1 |
| 5 | L22 | 2.8090 | 0.443 | | 1.8 |
| 6 | L31 | 9.6183 | 0.293 | 1.53463/56.18 | 1.8 |
| 7 | L32 | 3.4694 | 1.766 | | 1.7 |
| 8 | L41 | −2.6432 | 0.696 | 1.632445/23.35 | 3.2 |
| 9 | L42 | −1.8663 | 0.106 | | 3.6 |
| 10 | L51 | −1.4933 | 0.330 | 1.53463/56.18 | 3.9 |
| 11 | L52 | −4.1588 | 0.649 | | 4.3 |
| 12 | Window | Infinite | 0.210 | 1.5168/64.17 | 5.4 |
| 13 | | Infinite | 0.130 | | 5.5 |

TABLE 4

| # | Conic coefficient k | $\alpha_2$ | $\alpha_3$ | $\alpha_4$ | $\alpha_5$ | $\alpha_6$ |
|---|---|---|---|---|---|---|
| 2 | 0.0000 | −2.7367E−03 | 2.8779E−04 | −4.3661E−03 | 3.0069E−03 | −1.2282E−03 |
| 3 | −10.0119 | 4.0790E−02 | −1.8379E−02 | 2.2562E−02 | −1.7706E−02 | 4.9640E−03 |
| 4 | 10.0220 | 4.6151E−02 | 5.8320E−02 | −2.0919E−02 | −1.2846E−02 | 8.8283E−03 |
| 5 | 7.2902 | 3.6028E−02 | 1.1436E−01 | −1.9022E−02 | 4.7992E−03 | −3.4079E−03 |
| 6 | 0.0000 | 1.6639E−01 | 5.6754E−02 | −1.2238E−02 | −1.8648E−02 | 1.9292E−02 |
| 7 | 8.1261 | 1.5353E−01 | 8.1427E−02 | −1.5773E−01 | 1.5303E−01 | −4.6064E−02 |
| 8 | 0.0000 | −3.2628E−02 | 1.9535E−02 | −1.6716E−02 | −2.0132E−03 | 2.0112E−03 |
| 9 | 0.0000 | 1.5173E−02 | −1.2252E−02 | 3.3611E−03 | −2.5303E−03 | 8.4038E−04 |
| 10 | −4.7688 | −1.4736E−01 | 7.6335E−02 | −2.5539E−02 | 5.5897E−03 | −5.0290E−04 |
| 11 | 0.00E+00 | −8.3741E−02 | 4.2660E−02 | −8.4866E−03 | 1.2183E−04 | 7.2785E−05 |

Lens unit 200 provides a FOV of 43.48 degrees, with EFL=7 mm, F #=2.86 and TTL=5.90 mm. Thus, advantageously, the ratio TTL/EFL=0.843. Advantageously, the Abbe number of the first, third and fifth lens elements is 56.18. The first air gap between lens elements 202 and 204 has a thickness (0.129 mm) which is about half the thickness $d_2$ (0.251 mm). Advantageously, the Abbe number of the second lens element is 20.65 and of the fourth lens element is 23.35. Advantageously, the effective third air gap G between lens elements 206 and 208 is greater than TTL/5. Advantageously, the effective fourth air gap between lens elements 208 and 210 is smaller than TTL/50.

The focal length (in mm) of each lens element in lens unit 200 is as follows: f1=2.851, f2=−5.468, f3=−10.279, f4=7.368 and f5=−4.536. The condition 1.2×|f3|>|f2|>1.5× f1 is clearly satisfied, as 1.2×10.279>5.468>1.5×2.851. f1 also fulfills the condition f1<TTL/2, as 2.851<2.950.

Figure 4A:
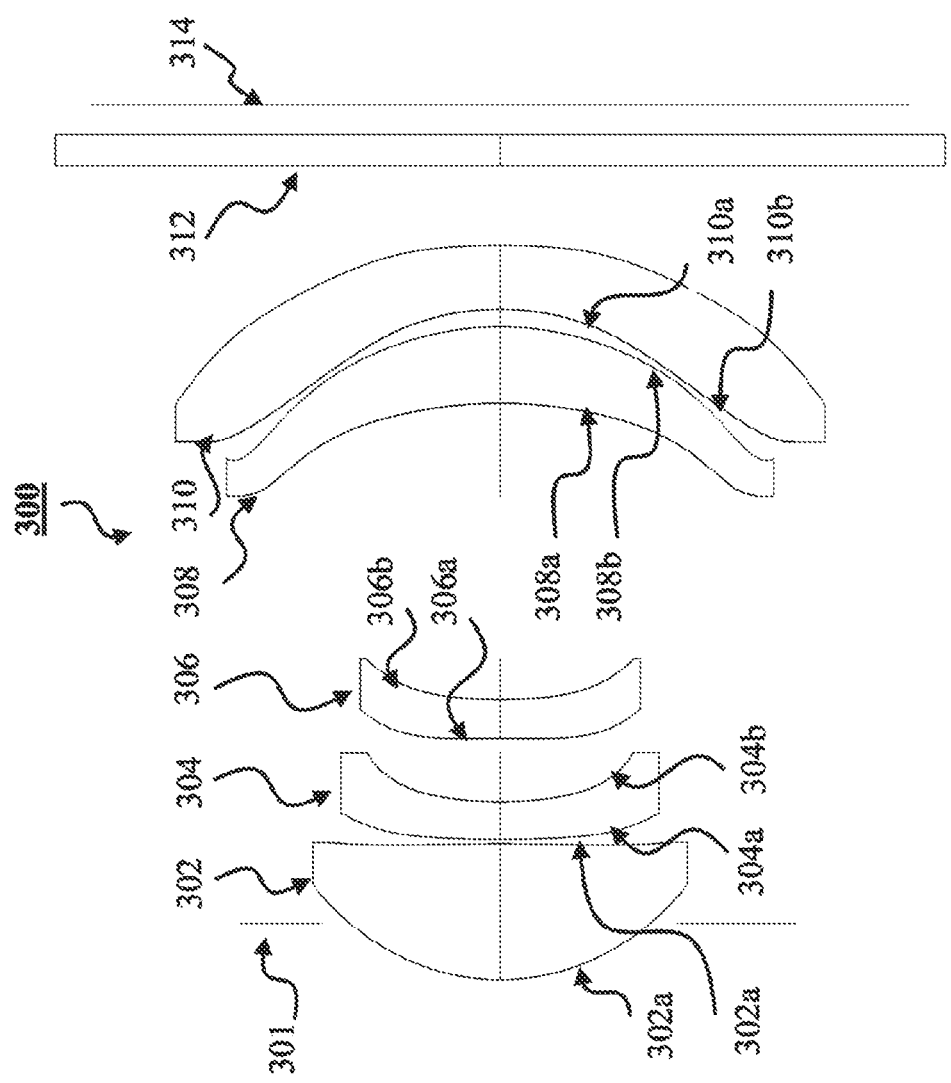
FIG. 4A is a schematic illustration of a specific configuration of the telephoto lens unit, according to a first example of the presently disclosed subject matter.
Figure 4B:
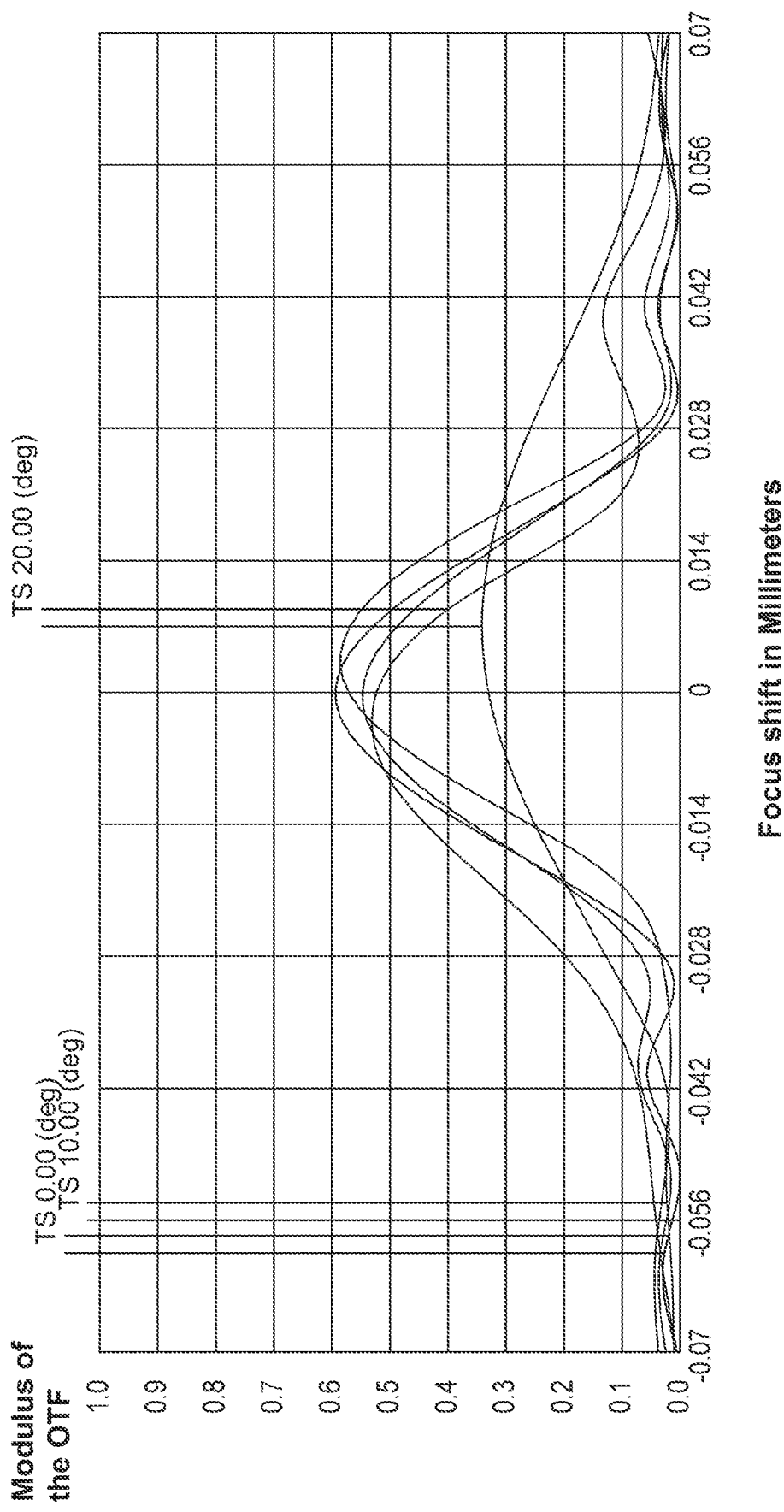
FIG. 4B shows a graph plotting the MTF vs. focus shift of the entire optical lens system for various fields in the lens unit of FIG. 4A.
Figure 4C:
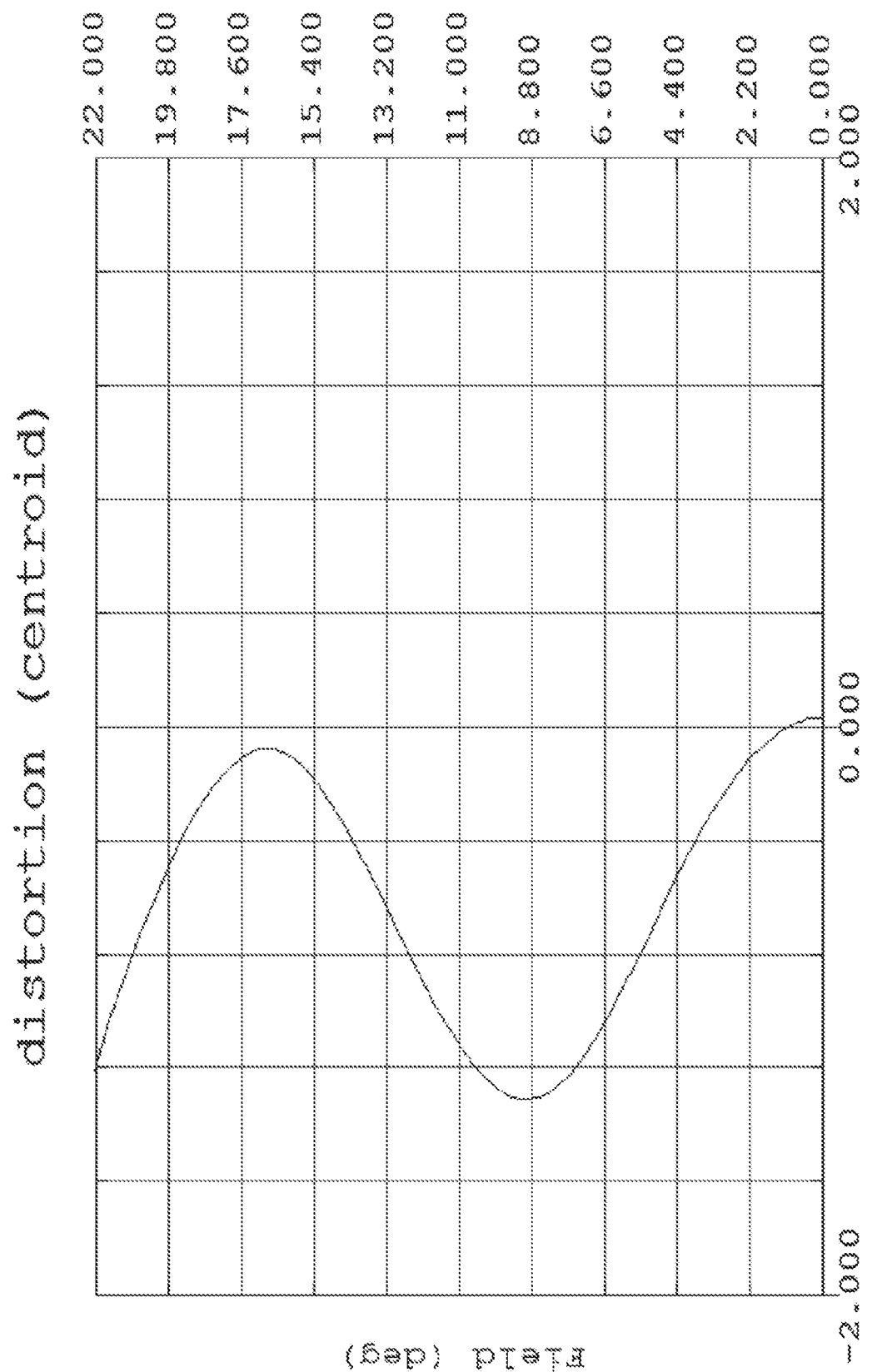
FIG. 4C shows a graph plotting the distortion +Y in percent for the lens unit of FIG. 4A.

FIG. 4A shows a schematic illustration of an optical lens unit 300, according to yet a further example of the presently disclosed subject matter. FIG. 4B shows the MTF vs. focus shift of the entire optical lens system for various fields in embodiment 300. FIG. 4C shows the distortion +Y in percent vs. field.

Lens unit 300 comprises, in order from an object side to an image side, an optional stop 301; a telephoto lens assembly including a first plastic lens element 302 with positive refractive power having a convex object-side surface 302a and a convex or concave image-side surface 302b, a second plastic lens element 204 with negative refractive power, having a meniscus convex object-side surface 304a, with an image side surface marked 304b, a third plastic lens element 306 with negative refractive power having a concave object-side surface 306a with an inflection point and a concave image-side surface 306b; and a field lens assembly including a fourth plastic lens element 308 with positive refractive power having a positive meniscus, with a concave object-side surface marked 308a and an image-side surface marked 308b, and a fifth plastic lens element 310 with negative refractive power having a negative meniscus, with a concave object-side surface marked 310a and an image-side surface marked 310b. Also, an optional glass window 312 may be disposed between the image-side surface 310b of fifth lens element 310 and an image plane 314.

According to the present example of lens unit 300, all lens element surfaces are aspheric. Detailed optical data is given in Table 5, and the aspheric surface data is given in Table 6, wherein the markings and units are the same as in, respectively, Tables 1 and 2. The equation of the aspheric surface profiles is the same as for lens units 100 and 200.

TABLE 5

| # | Comment | Radius R [mm] | Distances [mm] | Nd/Vd | Diameter [mm] |
|---|---------|---------------|----------------|-------|---------------|
| 1 | Stop    | Infinite      | −0.38          |       | 2.4           |
| 2 | L11     | 1.5127        | 0.919          | 1.5148/63.1 | 2.5     |
| 3 | L12     | −13.3831      | 0.029          |       | 2.3           |
| 4 | L21     | 8.4411        | 0.254          | 1.63549/23.91 | 2.1 |

TABLE 5-continued

| # | Comment | Radius R [mm] | Distances [mm] | Nd/Vd | Diameter [mm] |
|---|---------|---------------|----------------|-------|---------------|
| 5 | L22     | 2.6181        | 0.426          |       | 1.8           |
| 6 | L31     | −17.9618      | 0.265          | 1.5345/57.09 | 1.8 |
| 7 | L32     | 4.5841        | 1.998          |       | 1.7           |
| 8 | L41     | −2.8827       | 0.514          | 1.63549/23.91 | 3.4 |
| 9 | L42     | −1.9771       | 0.121          |       | 3.7           |
| 10 | L51    | −1.8665       | 0.431          | 1.5345/57.09 | 4.0 |
| 11 | L52    | −6.3670       | 0.538          |       | 4.4           |
| 12 | Window | Infinite      | 0.210          | 1.5168/64.17 | 3.0 |
| 13 |        | Infinite      | 0.200          |       | 3.0           |

TABLE 6

| # | Conic coefficient k | $\alpha_2$ | $\alpha_3$ | $\alpha_4$ | $\alpha_5$ | $\alpha_6$ |
|---|---------------------|------------|------------|------------|------------|------------|
| 2 | −0.534  | 1.3253E−02  | 2.3699E−02  | −2.8501E−02 | 1.7853E−02  | −4.0314E−03 |
| 3 | −13.473 | 3.0077E−02  | 4.7972E−03  | 1.4475E−02  | −1.8490E−02 | 4.3565E−03  |
| 4 | −10.132 | 7.0372E−04  | 1.1328E−01  | 1.2346E−03  | −4.2655E−02 | 8.8625E−03  |
| 5 | 5.180   | −1.9210E−03 | 2.3799E−01  | −8.8055E−02 | 2.1447E−01  | −1.2702E−01 |
| 6 | 0.000   | 2.6780E−01  | 1.8129E−02  | −1.7323E−02 | 3.7372E−02  | −2.1356E−02 |
| 7 | 10.037  | 2.7660E−01  | −1.0291E−02 | −6.0955E−02 | 7.5235E−02  | −1.6521E−02 |
| 8 | 1.703   | 2.6462E−02  | −1.2633E−02 | −4.7724E−04 | −3.2762E−03 | 1.6551E−03  |
| 9 | −1.456  | 5.7704E−03  | −1.8826E−02 | 5.1593E−03  | −2.9999E−03 | 8.0685E−04  |
| 10 | −6.511 | −2.1699E−01 | 1.3692E−01  | −4.2629E−02 | 6.8371E−03  | −4.1415E−04 |
| 11 | 0.000  | −1.5120E−01 | 8.6614E−02  | −2.3324E−02 | 2.7361E−03  | −1.1236E−04 |

Lens unit 300 provides a FOV of 44 degrees, EFL=6.84 mm, F #=2.80 and TTL=5.904 mm. Thus, advantageously, the ratio TTL/EFL=0.863. Advantageously, the Abbe number of the first lens element is 63.1, and of the third and fifth lens elements is 57.09. The first air gap between lens elements 302 and 304 has a thickness (0.029 mm) which is about $\frac{1}{10}^{th}$ the thickness $d_2$ (0.254 mm). Advantageously, the Abbe number of the second and fourth lens elements is 23.91. Advantageously, the effective third air gap G between lens elements 306 and 308 is greater than TTL/5. Advantageously, the effective fourth air gap between lens elements 308 and 310 is smaller than TTL/50.

The focal length (in mm) of each lens element in embodiment 300 is as follows: f1=2.687, f2=−6.016, f3=−6.777, f4=8.026 and f5=−5.090. The condition 1.2×|f3|>|f2|>1.5× f1 is clearly satisfied, as 1.2×6.777>6.016>1.5×2.687. f1 also fulfills the condition f1<TTL/2, as 2.687<2.952.

Tables 7 and 8 provide respectively detailed optical data and aspheric surface data for a fourth embodiment of an optical lens system disclosed herein. The markings and units are the same as in, respectively, Tables 1 and 2. The equation of the aspheric surface profiles is the same as for lens systems 100, 200 and 300. The lens elements in Tables 7 and 8 are designed to provide an image on an entire ¼" sensor having dimensions of approximately 3.66×2.75 mm.

TABLE 7

| # | Comment | Radius R [mm] | Distances [mm] | Nd/Vd | Diameter [mm] |
|---|---------|---------------|----------------|-------|---------------|
| 1 | Stop    | Infinite      | −0.427         |       | 2.1           |
| 2 | L11     | 1.3860        | 0.847          | 1.534809/55.66 | 2.2    |
| 3 | L12     | −8.5270       | 0.073          |       | 2.1           |
| 4 | L21     | 11.1443       | 0.239          | 1.639078/23.253 | 1.9   |
| 5 | L22     | 1.8641        | 0.504          |       | 1.7           |
| 6 | L31     | 19.7342       | 0.239          | 1.534809/55.66 | 1.7    |
| 7 | L32     | 3.9787        | 1.298          |       | 1.7           |
| 8 | L41     | −3.3312       | 0.522          | 1.639078/23.253 | 2.8   |
| 9 | L42     | −1.7156       | 0.079          |       | 3.1           |
| 10 | L51    | −1.7788       | 0.298          | 1.534809/55.66 | 3.5    |

TABLE 7-continued

| # | Comment | Radius R [mm] | Distances [mm] | Nd/Vd | Diameter [mm] |
|---|---------|---------------|----------------|-------|---------------|
| 11 | L52 | −12.6104 | 0.792 | | 3.7 |
| 12 | Window | Infinite | 0.210 | 1.5168/64.17 | 4.5 |
| 13 | | Infinite | 0.177 | | 4.6 |

TABLE 8

| # | Conic coefficient k | α2 | α3 | α4 | α5 | α6 |
|---|---|---|---|---|---|---|
| 2 | −0.326 | 8.776E−03 | 2.987E−02 | −6.001E−02 | 6.700E−02 | −2.849E−02 |
| 3 | −10.358 | 4.266E−02 | −2.240E−02 | 2.914E−02 | −3.025E−02 | 3.108E−03 |
| 4 | 11.447 | −3.257E−02 | 9.780E−02 | −1.143E−02 | −3.844E−02 | 1.005E−02 |
| 5 | −0.026 | −3.631E−02 | 2.928E−01 | −2.338E−01 | 3.334E−01 | −2.760E−02 |
| 6 | 0.000 | 1.578E−01 | −2.229E−02 | −4.991E−02 | 1.663E−01 | −1.298E−01 |
| 7 | 3.860 | 2.044E−01 | 5.451E−02 | −3.199E−01 | 5.619E−01 | −3.663E−01 |
| 8 | 4.094 | 3.706E−02 | −5.931E−02 | 4.662E−02 | −4.654E−02 | 1.606E−02 |
| 9 | −9.119 | −7.980E−02 | −1.376E−03 | 5.622E−03 | −6.715E−03 | 2.127E−03 |
| 10 | −12.777 | −2.695E−01 | 1.894E−01 | −5.690E−02 | 8.689E−03 | −5.269E−04 |
| 11 | 0.000 | −1.807E−01 | 1.278E−01 | −4.504E−02 | 6.593E−03 | −2.357E−04 |

The focal length (in mm) of each lens element according to this example is as follows: f1=2.298, f2=−3.503, f3=−9.368, f4=4.846 and f5=−3.910. The condition 1.2× |f3|>|f2|>1.5×f1 is clearly satisfied, as 1.2× 9.368>3.503>1.5×2.298. f1 also fulfills the condition f1<TTL/2, as 2.298<2.64.

Generally, with regard to the effective air gap between the adjacent lens elements, the following should be noted.

In each one of the lens units exemplified above, the first three lens elements (L1, L2 and L3) achieve essentially a telephoto effect for all fields (angles of object orientation relative to the optical axis), i.e. achieve a strong concentration (by L1) followed by partial collimation (mainly by L2 but also by L3). The fact that all fields need to have essentially the same telephoto effect leads to relatively small distances (small air gaps) between the three lens elements, e.g. especially between L1 and L2 (air gap 1). L4 and L5 are mainly field lens elements for reducing field curvature, i.e. their main effect is to cause the focal point for all fields (where the object distance is approximately infinity) to reside on the sensor plane. To achieve this, it is advantageous that for every field, the corresponding rays hit L4 and L5 at different locations, thus enabling separate adjustment for every field ("field separation").

The inventors have found that the desired fields' separation is obtainable in a lens unit design characterized by an "effective air gap" G between lenses L3 and L4 (between the telephoto and field lens assemblies, where a larger G leads to larger separation between the fields).

Figure 5:
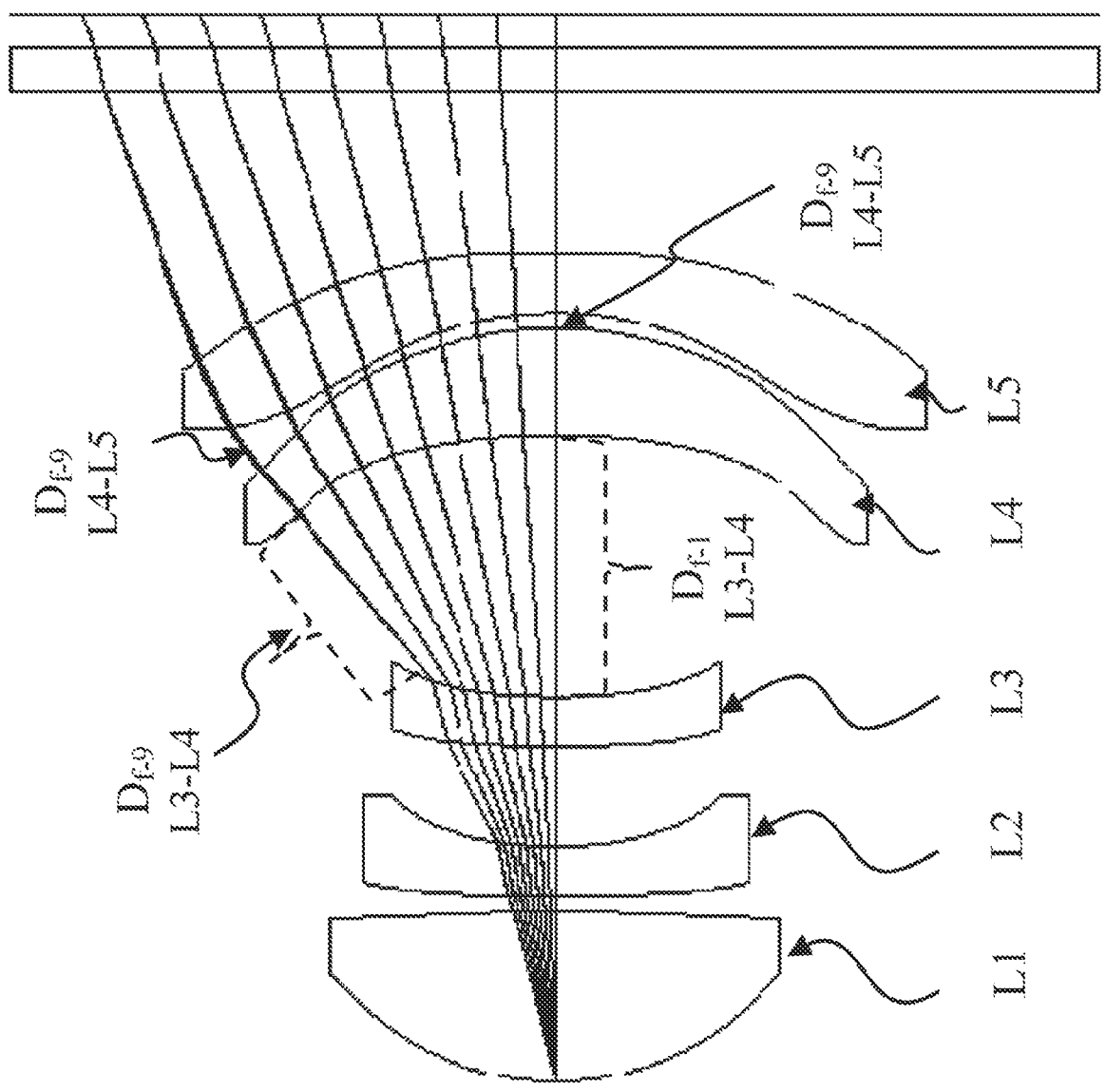
FIG. 5 is a schematic illustration showing the concept of an effective air gap between adjacent lenses in an optical lens unit, according to the presently disclosed subject matter.

FIG. 5 illustrates the concept of the effective air gap between the two adjacent lens elements. First, an "air gap per field" Di-n is defined as the length of the $n^{th}$ field's chief ray along the respective chief ray between adjacent lens elements. Effective gap $D_{Leff}$ is then defined as the average of N air gaps per field for field angles α separated evenly between α=0 (for ray 1, air gap $D_{f-1}$) to α=$α_{max}$ (for ray N, air gap $D_{f-n}$), where ray N hits the end pixel on the image sensor diagonal. In other words, between each pair of adjacent lens elements (e.g. between L3 and L4 and between L4 and L5):

$$D_{Leff} = \left(\sum_{n=1}^{N} D_{f-n}\right)/N$$

In essence, the effective air gap between adjacent lens elements reflects an average effective distance between the two surfaces bounding the air gap between the two adjacent lens elements. Exemplarily, in FIG. 5 there are N=9 chief rays (and 9 related field air gaps) and the chief rays are distributed angularly evenly between α=0 for ray 1 and $α_{max}$ for ray 9. At $α_{max}$, ray 9 hits the end pixel on the image sensor diagonal.

Table 9 shows data on TTL, $D_{Leff-3}$, $D_{Leff-4}$, and ratios between the TTL and the effective air gaps for each of lens units 100, 200 and 300 above $D_{Leff-3}$ and $D_{Leff-4}$ were calculated using 9 chief rays, as shown in FIG. 4.

TABLE 9

| Embodiment | TTL | $D_{Leff-3}$ = G | $D_{Leff-4}$ | $D_{Leff-3}$/TTL | $D_{Leff-4}$/TTL |
|---|---|---|---|---|---|
| 100 | 5.903 | 1.880 | 0.086 | 0.319 | 0.015 |
| 200 | 5.901 | 1.719 | 0.071 | 0.291 | 0.012 |
| 300 | 5.904 | 1.925 | 0.094 | 0.326 | 0.016 |
| 400 | 5.279 | 1.263 | 0.080 | 0.246 | 0.015 |

Using $D_{Leff-3}$=G instead of the commonly used distance along the optical axis between L3 and L4 ensures better operation (for the purpose of reduction of field curvature) of lens elements L4 and L5 for all the fields. As seen in Table 9, good field separation may exemplarily be achieved if $D_{Leff-3}$=G>TTL/5.

A compact optical design requires that the diameter of L5 be as small as possible while providing the required performance. Since the lens and camera footprint is determined by L5 diameter, a small effective air gap, $D_{Leff-4}$, between lenses L4 and L5 is advantageous in that it allows a small diameter of lens L5 without degrading the optical performance. Effective air gap $D_{Leff-4}$ is a better indicator of the L5 diameter than the commonly used air gap along the optical axis between L4 and L5. An adequately small L5 diameter may exemplarily be achieved if the effective air gap between the field lenses L4 and L5 is $D_{Leff-4}$<TTL/50. It should be noted that an effective air gap $D_{Leff}$ can be calculated in principle using any combination of two or more chief rays (for example ray 1 and ray 9 in FIG. 4). However, the "quality" of $D_{Leff}$ calculation improves while considering an increased number of chief rays.

The miniature telephoto lens units described above with reference to FIGS. 1C and 2 to 5 are designed with a TTL shorter than EFL. Accordingly, due to shorter TTL, such lens units have a smaller field of view, as compared to standard mobile phone lens units. Therefore, it would be particularly useful to use such a telephoto lens unit as a Tele sub-camera lens unit in a dual aperture zoom camera. Such a dual aperture zoom camera is described in the above-mentioned WO14199338 of the same assignee as the present application.

As mentioned above, a problem associated with the use of conventional Wide and Tele lens modules in a camera is associated with the different lengths/heights of the lenses which can cause shadowing and light blocking effects. According to the presently disclosed subject matter it is suggested to eliminate or at least significantly reduce these shadowing and light blocking effects by replacing the conventional Tele lens module by the miniature telephoto lens unit described above in the dual aperture camera.

Thus, according to the presently disclosed subject matter, the problem discussed above posed by a difference in the TTL/EFL ratios of the conventional Tele and Wide lenses may be solved through use of a standard lens for the Wide camera ($TTL_W/EFL_W > 1.1$, typically 1.3) and of a special Telephoto lens design for the Tele camera ($TTL_T/EFL_T < 1$, e.g. 0.87), where the telephoto lens unit is configured as described above, providing the miniature telephoto lens unit.

Using the above described miniature telephoto lens unit enables to reduce the $TTL_T$ (according to one non-limiting example down to 7×0.87=6.09 mm) leading to a camera height of less than 7 mm (which is an acceptable height for a smartphone or any other mobile electronic device). The height difference between the telephoto lens unit and the Wide lens unit is also reduced to approximately 1.65 mm, thus reducing shadowing and light blocking problems.

According to some examples of a dual-aperture camera disclosed herein, the ratio "e"=$EFL_T/EFL_W$ is in the range 1.3-2.0. In some embodiments, the ratio $TTL_T/TTL_W < 0.8e$. In some embodiments, $TTL_T/TTL_W$ is in the range 1.0-1.25. According to some examples disclosed herein, $EFL_W$ may be in the range 2.5-6 mm and $EFL_T$ may be in the range 5-12 mm.

Figure 6A:
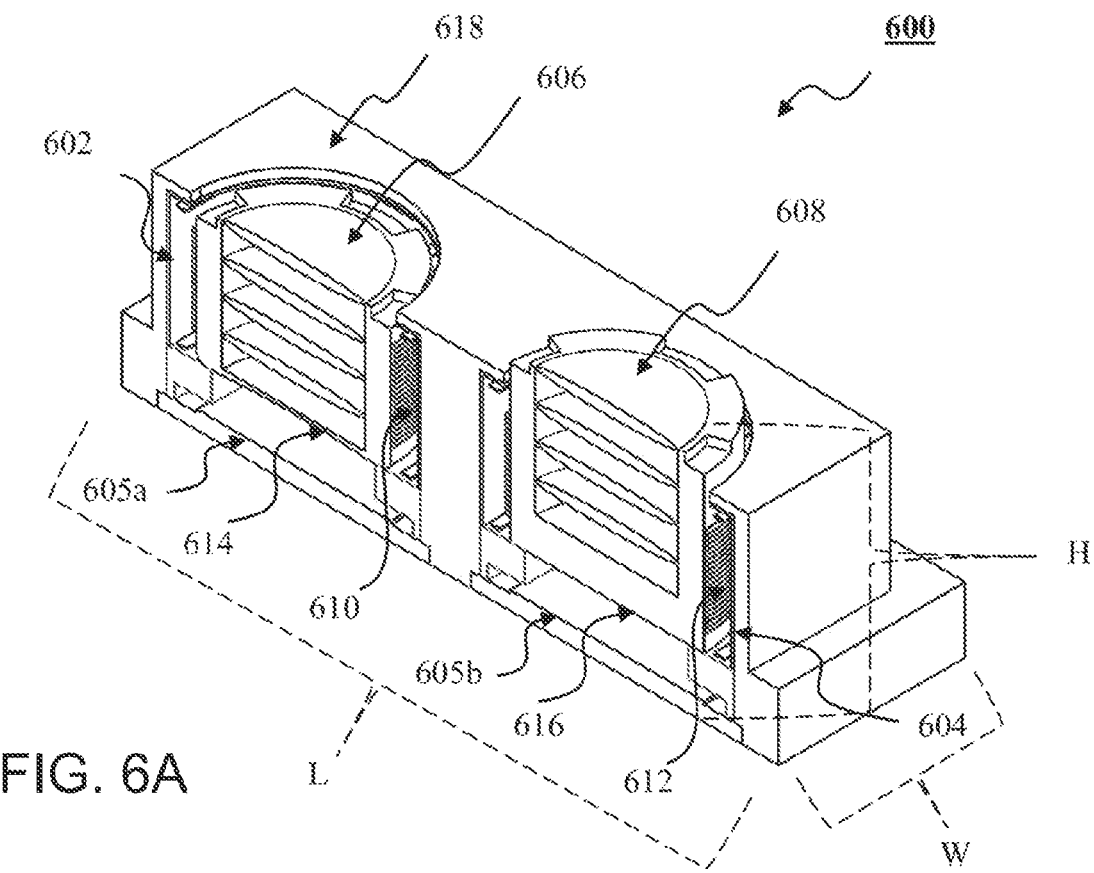
FIG. 6A is a schematic illustration, in perspective cross section, of an example of a dual-aperture zoom camera, with each camera on a separate printed circuit board (PCB), according to the presently disclosed subject matter.

Referring now to the figures, FIG. 6A shows schematically in perspective cross section an example of a dual-aperture zoom camera device 600. Camera device 600 includes two camera units 602 and 604. It should be understood that the two camera units may be associated with common or separate detectors (pixel matrix and their associated read out circuits). Thus, the two camera units are actually different in their optics, i.e. in the imaging channels defined by the wide and telephoto lens units. Each camera unit may be mounted on a separate PCB (respectively 605a and 605b) including the read out circuit, and includes a lens unit (respectively 606 and 608), and an image sensor including a pixel matrix (respectively 614 and 616), and an actuator (respectively 610 and 612) associated with a focusing mechanism. In this embodiment, the two PCBs lie in the same plane. It should be understood that in the embodiment where the readout circuits of the two imaging channels are in the same plane, a common PCB can be used, as will be described further below. The two camera units are connected by a case 618. For example, camera 602 includes a Wide lens unit and camera 604 includes a Telephoto lens unit, the $TTL_T$ of the lens unit defining the respective camera height H. For example, the Wide and Telephoto lens units provide respectively main and auxiliary optical/imaging paths, enabling to use the main image for interpreting the auxiliary image data.

Figure 6B:
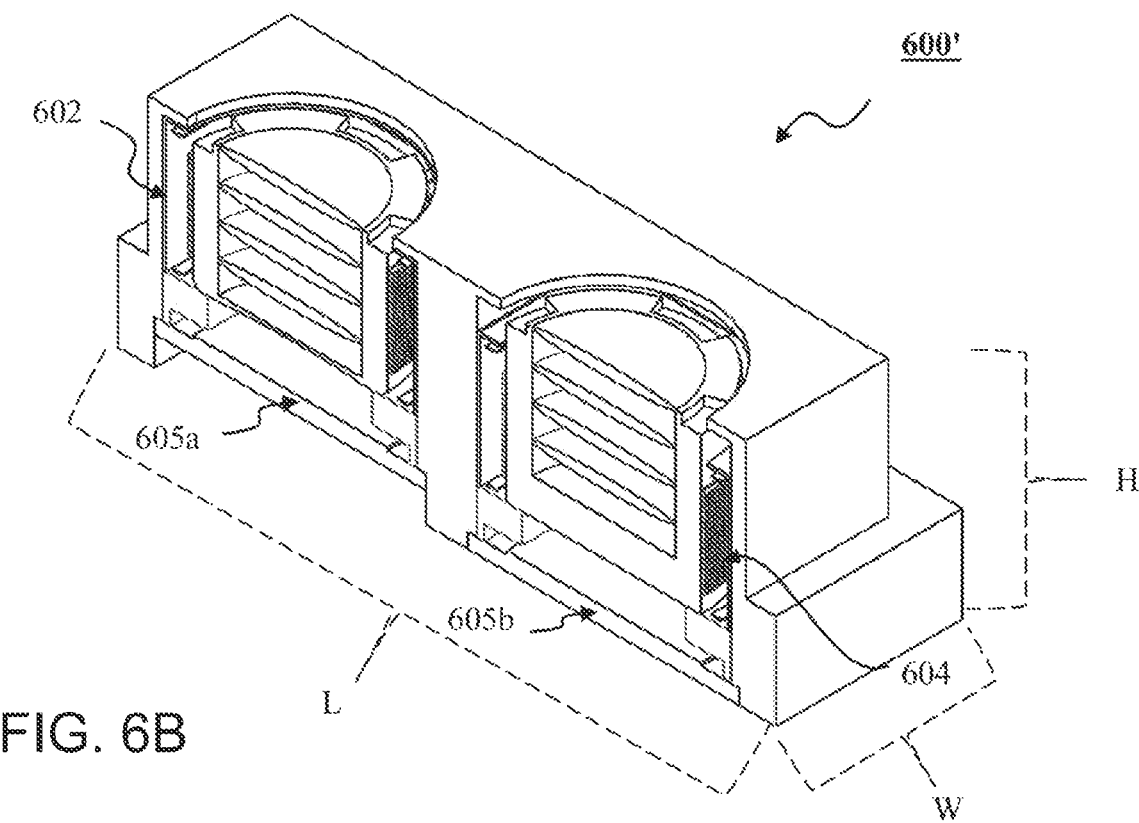
FIG. 6B is a schematic illustration, in perspective cross section, of another example of a dual-aperture zoom camera, with each camera on a separate PCB, according to the presently disclosed subject matter.

FIG. 6B shows schematically, in perspective cross, another example of a dual-aperture zoom camera 600' utilizing the principles of the invention. Camera 600' is generally similar to the above-described camera 600, and the common components are shown in the figure in a self-explanatory manner and thus are not indicated by reference numbers. As in camera 600, in the camera 600', the camera unit 602 (e.g. a Wide lens camera) and camera unit 604 (e.g. a Telephoto lens camera) are mounted on separate PCBs (respectively 605a and 605b). However, in contrast with camera 600, in camera 600' the two PCBs lie in different planes. This enables the object side principal planes of the Wide and Telephoto lens units to be close one to the other, thus reducing the dependency of magnification factor in the two units on the object distance.

For example, camera dimensions for the cameras shown in FIGS. 6A and 6B may be as follows: a length L of the camera (in the Y direction) may vary between 13-25 mm, a width W of the camera (in the X direction) may vary between 6-12 mm, and a height H of the camera (in the Z direction, perpendicular to the X-Y plane) may vary between 4-12 mm. More specifically, considering a smartphone camera example disclosed herein, L=18 mm, W=8.5 mm and H=7 mm.

Figure 7:
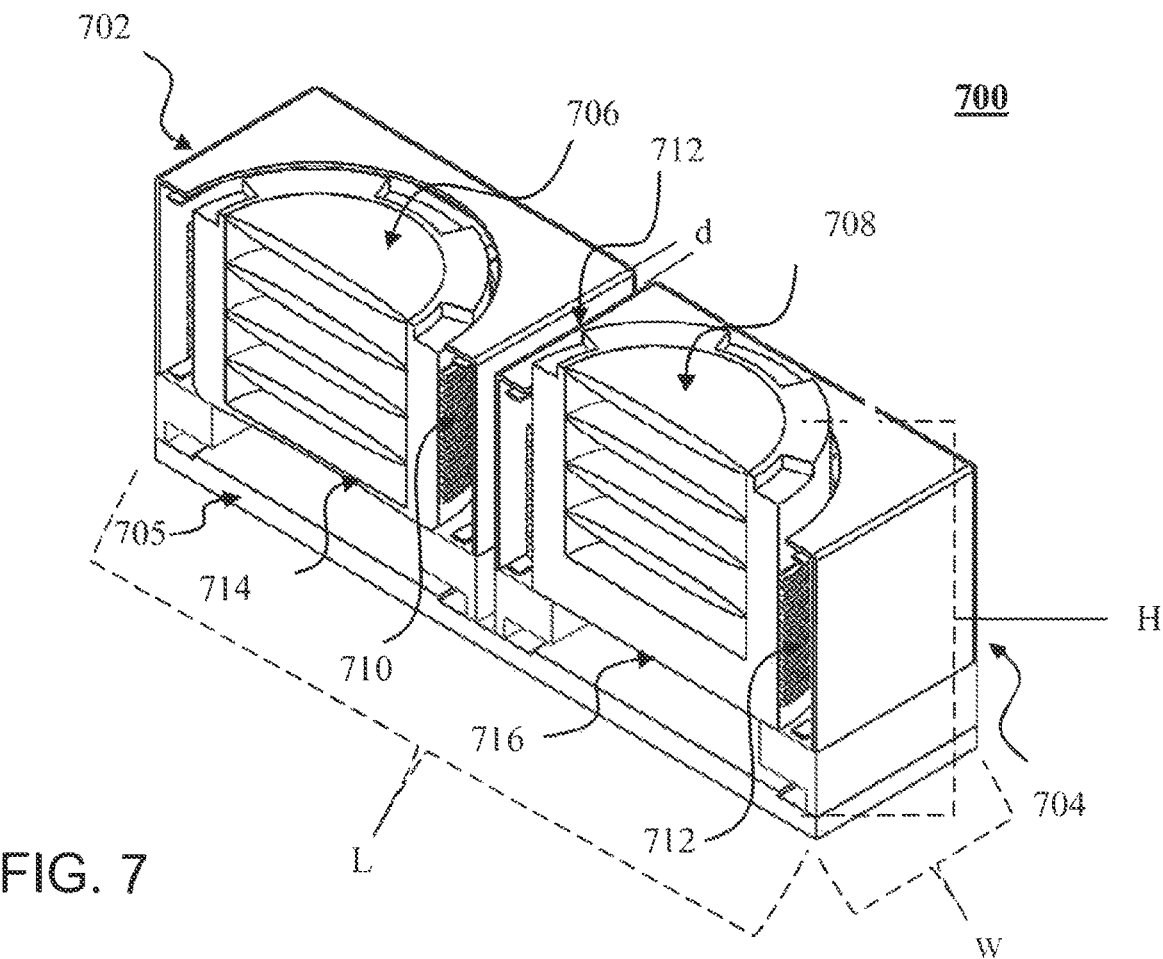
FIG. 7 is a schematic illustration, in perspective cross section, of yet another example of a dual-aperture zoom camera, where both cameras are mounted on a single PCB, according to the presently disclosed subject matter.

FIG. 7 shows schematically, in perspective cross section, yet another example of a dual-aperture zoom camera 700. Camera 700 is similar to cameras 600 and 600' in that it includes two camera units 702 and 704 with respective lens units 706 and 708, respective actuators 710 and 712 and respective image sensors 714 and 716. However, in camera 700, the two camera units 702 and 704 are mounted on a single (common) PCB 705. The mounting on a single PCB and the minimizing of a distance "d" between the two camera units minimizes and may even completely avoid camera movement (e.g. associated with mishaps such as drop impact). In general, the dimensions of camera 700 may be in the same range as those of cameras 600 and 600'. However, for the same sensors and optics, the footprint W×L and the weight of camera 700 are smaller than that of cameras 600 and 600'. Mishaps such as drop impact may cause a relative movement between the two cameras after system calibration, changing the pixel matching between the Tele and Wide images and thus preventing fast reliable fusion of the Tele and Wide images. Therefore, such effects should preferably be eliminated.

As described above, the high-quality imaging is also associated with the implementation of standard optical image stabilization (OIS) in such a dual-aperture zoom camera. Standard OIS compensates for camera tilt ("CT"), i.e., image blur, by a parallel-to-the image sensor (exemplarily in the X-Y plane) lens movement ("LMV"). The amount of LMV (in millimeters) needed to counter a given camera tilt depends on the camera lens EFL, according to the relation:

LMV=CT*EFL, where "CT" is in radians and EFL is in mm.

Since the Wide and telephoto lens units have significantly different EFLs, both lenses cannot move together and achieve optimal tilt compensation for both of the respective camera units. More specifically, since the tilt is the same for both camera units, a movement that will compensate for the tilt for the Wide camera unit will be insufficient to compensate for the tilt for the Telephoto camera unit, and vice versa. Using separate OIS actuators for the two camera units respectively can achieve simultaneous tilt compensation for both of them, but the entire system would be complex and costly, which is undesirable for portable electronic devices.

Figure 8:
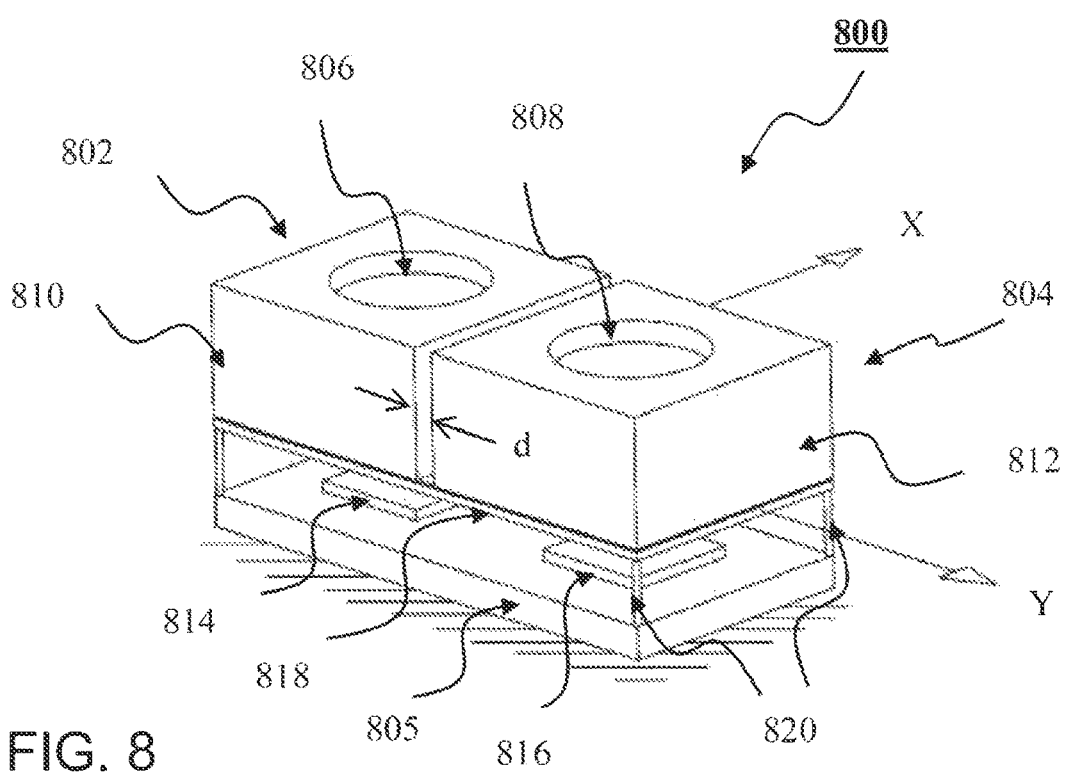
FIG. 8 is a schematic illustration of an example of a dual-aperture zoom camera that includes an OIS mechanism, according to the presently disclosed subject matter.

In this connection, reference is made to FIG. 8 which shows an example of a dual-aperture zoom camera 800

Figure 9:
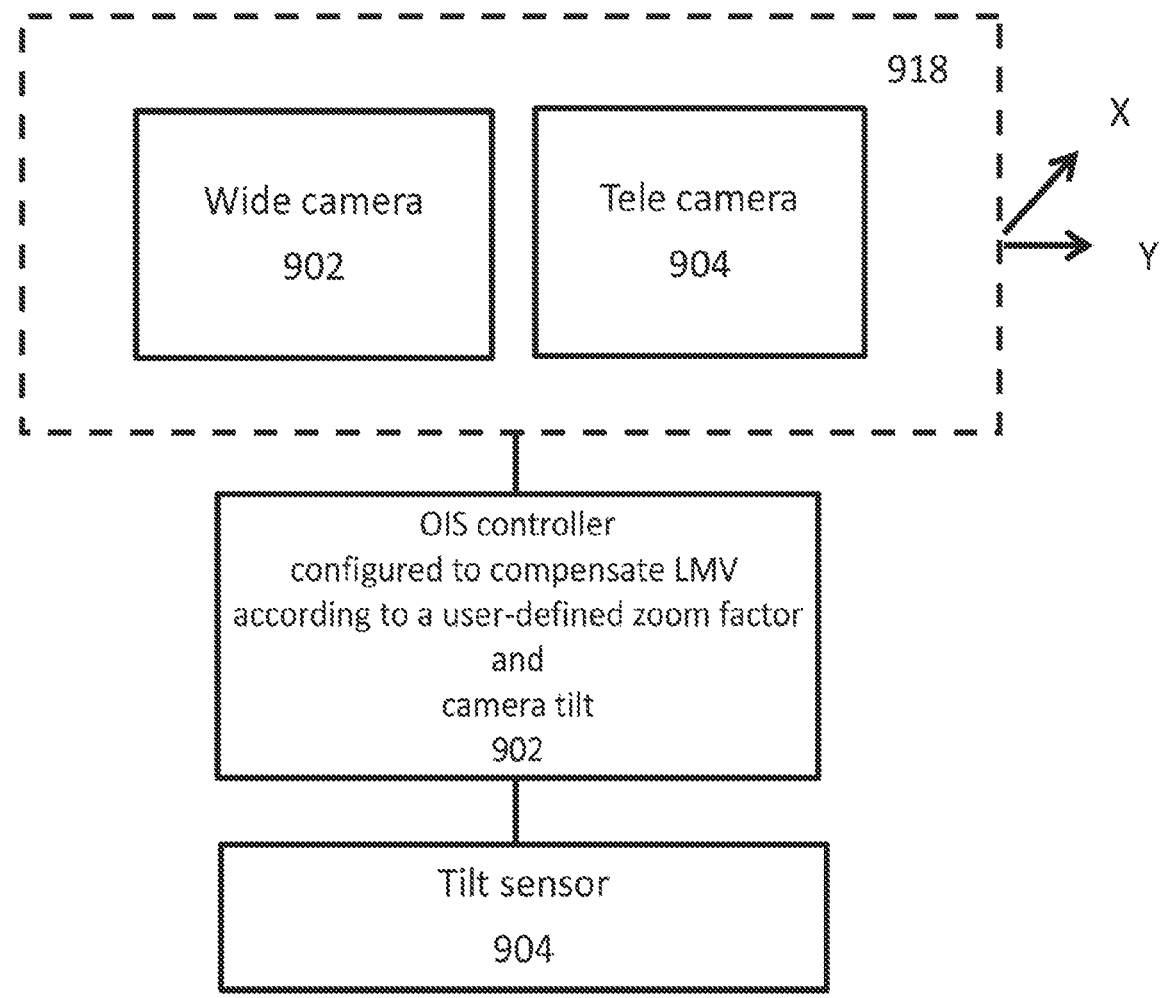
FIG. 9 shows schematically a functional block diagram of the camera example of FIG. 8, according to the presently disclosed subject matter.

(similar to the above-described camera 700) that includes two camera units 802 and 804 mounted either on a single PCB 805 (as shown in this example) or on separate PCBs. Each camera unit includes a lens unit (respectively 806 and 808), an actuator (respectively 810 and 812) and an image sensor (respectively 814 and 816). The two actuators are rigidly mounted on a rigid base 818 that is flexibly connected to the PCB (or PCBs) through flexible elements 820. Base 818 is movable by an OIS mechanism (not shown) controlled by an OIS controller 902 (shown in FIG. 9). The OIS controller 902 is coupled to, and receives camera tilt information from a tilt sensor (e.g. a gyroscope) 904 (FIG. 9). More details of an example of an OIS procedure as disclosed herein are given below with reference to FIG. 9. The two camera units are separated by a small distance "d", e.g. 1 mm. This small distance between camera units also reduces the perspective effect enabling smoother zoom transition between the camera units.

As indicated above, the two image sensors 814 and 816 may be mounted on separate PCBs that are rigidly connected, thereby enabling adaptation of an OIS mechanism to other system configurations, for example those described above with reference to FIGS. 6A and 6B.

In some embodiments, and optionally, a magnetic shield plate may be used, e.g. as described in co-owned U.S. patent application Ser. No. 14/365,718 titled "Magnetic shielding between voice coil motors in a dual-aperture camera", which is incorporated herein by reference in its entirety. Such a magnetic shield plate may be inserted in the gap (with width d) between the Wide and Tele camera units.

In general, the dimensions of camera 800 may be in the same range as those of cameras 600, 600' and 700.

Reference is made to FIG. 9, which exemplifies the camera operation, utilizing a tilt sensor 904 which dynamically measures the camera tilt (which is the same for both the Wide and Tele camera units). As shown, an OIS controller 902 (electronic circuit including hardware/software components) is provided, which is coupled to the actuators of both camera units (e.g. through base 818), and receives a CT input from the tilt sensor 904 and a user-defined zoom factor, and controls the lens movement of the two camera units to compensate for the tilt. The LMV is for example in the X-Y plane. The OIS controller 902 is configured to provide a LMV equal to $CT*EFL_{ZF}$, where "$EFL_{ZF}$" is chosen according to the user-defined zoom factor, ZF. According to one example of an OIS procedure, when ZF=1, LMV is determined by the Wide camera unit's $EFL_W$ (i.e. $EFL_{ZF}=EFL_W$ and $LMV=CT*EFL_W$). Further, when ZF>e (i.e. $ZF>EFL_T/EFL_W$), LMV is determined by the telephoto camera unit's $EFL_T$ (i.e. $EFL_{ZF}=EFL_T$ and $LMV=CT*EFL_T$). Further yet, for a ZF between 1 and e, the $EFL_{ZF}$ may shift gradually from $EFL_W$ to $EFL_T$ according to $EFL_{ZF}=ZF*EFL_W$.

Thus, the present invention provides a novel approach for configuring a camera device suitable for use in portable electronic devices, in particular smart phones. The present invention solves various problems associated with the requirements for physical parameters of such devices (weight, size), high image quality and zooming effects.

What is claimed is:

1. A dual-aperture camera, comprising:
an integrated camera that comprises a Wide camera unit having a Wide lens unit with a field of view $FOV_W$ and having a total track length $TTL_W$ and an effective focal length $EFL_W$, and a Telephoto camera unit comprising a Telephoto lens unit with a Telephoto field of view $FOV_T$, a total track length $TTL_T$ and an effective focal length $EFL_T$,
wherein the $TTL_T$ includes a glass window,
wherein a ratio $TTL_W/EFL_W$ is greater than 1,
wherein a ratio $TTL_T/EFL_T$ is smaller than 1,
wherein the Telephoto lens unit has an optical axis, an optical diameter smaller than 5 mm and a F# smaller than 3.2 and includes, in order from an object plane to an image plane along the optical axis, a first lens element having positive optical power and two last lens elements, wherein one of the two last lens elements has an Abbe number greater than 50, and wherein the other of the two last lens elements has an Abbe number smaller than 30.

2. The dual-aperture camera of claim 1, wherein $EFL_T$ is in the range $EFL_T$=5-12 mm.

3. The dual-aperture camera of claim 1, wherein F# is smaller than 2.9.

4. The dual-aperture camera of claim 1, wherein $TTL_T/EFL_T$ is smaller than 0.9.

5. The dual-aperture camera of claim 1, wherein the Telephoto lens unit includes a pair of lens elements formed by a second lens element and a third lens element, and wherein the pair of lens elements has a combined negative optical power.

6. The dual-aperture camera of claim 1, wherein the first lens element of the Telephoto lens unit has a focal length f1 smaller than $TTL_T/2$.

7. The dual-aperture camera of claim 1, wherein the two last lens elements are spaced apart from one another by an effective air gap smaller than $TTL_T/50$.

8. The dual-aperture camera of claim 1, wherein the first, second and third lens elements have respective focal lengths f1, f2 and f3, and wherein the respective focal lengths satisfy the condition $1.2|f3|>|f2|>1.5f1$.

9. The dual-aperture camera of claim 1, wherein the Telephoto camera unit includes an image sensor with an image sensor size ¼" to ⅓".

10. The dual-aperture camera of claim 1, wherein the Wide and Telephoto camera units are spaced from one another a distance of about 1 mm.

11. The dual-aperture camera of claim 1, wherein $TTL_T$ is smaller than 5.5 mm.

12. The dual-aperture of claim 1, included in a mobile electronic device.

13. The dual-aperture camera of claim 12, wherein the mobile device is a smartphone.

14. The dual-aperture of claim 2, included in a mobile electronic device.

15. The dual-aperture camera of claim 14, wherein the mobile device is a smartphone.

16. The dual-aperture of claim 3, included in a mobile electronic device.

17. The dual-aperture camera of claim 16, wherein the mobile device is a smartphone.

18. The dual-aperture of claim 4, included in a mobile electronic device.

19. The dual-aperture camera of claim 18, wherein the mobile device is a smartphone.

* * * * *